US006431004B2

(12) United States Patent
Ishihara et al.
(10) Patent No.: US 6,431,004 B2
(45) Date of Patent: Aug. 13, 2002

(54) PRESSURE SENSITIVE SENSOR TERMINAL PROCESSING METHOD

(75) Inventors: Hidenori Ishihara, Hamamatsu; Noboru Tsuge, Kariya; Shigeru Kashiwazaki, Hitachi; Fumitaka Nakahigashi, Hitachi; Koji Horii, Hitachi, all of (JP)

(73) Assignee: Asmo Co., Ltd. & Hitachi Cable, Ltd. (JP)

( * ) Notice: Subject to any disclaimer, the term of this patent is extended or adjusted under 35 U.S.C. 154(b) by 0 days.

(21) Appl. No.: 09/755,142

(22) Filed: Jan. 8, 2001

Related U.S. Application Data

(62) Division of application No. 09/210,810, filed on Dec. 15, 1998, now Pat. No. 6,260,418.

(30) Foreign Application Priority Data

Dec. 17, 1997 (JP) ........................................... 9-348343
Oct. 16, 1998 (JP) ........................................... 10-295769

(51) Int. Cl.[7] ........................................... G01L 9/02
(52) U.S. Cl. ........................................... 73/719
(58) Field of Search .................. 73/715, 716, 717–727, 73/756; 361/283.1–283.4; 29/25.42, 25.35, 25.41

(56) References Cited

U.S. PATENT DOCUMENTS

| | | | | |
|---|---|---|---|---|
| 4,875,135 A | * 10/1989 | Bishop et al. | ................ | 73/718 |
| 5,087,799 A | 2/1992 | Pariot et al. | | |
| 5,192,837 A | 3/1993 | Chardon | | |
| 5,444,901 A | * 8/1995 | Wiegand | ................... | 29/25.42 |
| 5,461,922 A | * 10/1995 | Koen | .......................... | 73/756 |

FOREIGN PATENT DOCUMENTS

| | | |
|---|---|---|
| GB | 2304458 | 3/1997 |
| JP | 35-31437 | 11/1960 |
| WO | 97/21235 | 6/1997 |

* cited by examiner

*Primary Examiner*—William Oen
(74) *Attorney, Agent, or Firm*—Parkhurst & Wendel, LLP

(57) ABSTRACT

Support members are provided on the terminal portions of a sensor main body. In this state, a seal portion is formed by molding, and the seal portion seals the terminal portions of the sensor main body. During molding, external pressure acts on a housing. However, since four electrode wires pulled out from the housing are supported by insulating support members, the four electrode wires do not contact one another due to the pressure applied during molding, and thus do not short-circuit.

12 Claims, 15 Drawing Sheets

PRESSURE SENSITIVE SENSOR TERMINAL PROCESSING METHOD

This is a Division of application Ser. No. 09/210,810 filed Dec. 15, 1998 now U.S. Pat. No. 6,260,418.

BACKGROUND OF THE INVENTION

1. Field of the Invention

The present invention relates to a pressure sensitive sensor for detecting an external force by a housing elastically deformed by external pressure and electrodes provided in the housing contacting each other, and to a pressure sensitive sensor terminal processing method and manufacturing method.

2. Description of the Related Art

There are pressure sensitive sensors in which a plurality of electrodes made of metal plates, metal wires or the like are disposed within an elastically deformable housing so as to be spaced apart from one another. The housing is elastically deformed by pressure such that the plurality of electrodes contact one other, thereby causing electrical continuity, or a short-circuit, so that the pressure is detected.

In such a pressure sensitive sensor, terminal portions are open in order to be coupled to a connecting means, such as a cord, extending from a determination means such as a computer. Therefore, usually, the connecting means and the electrodes are coupled and then sealed to prevent malfunctioning resulting from, for example, entry of water. From the viewpoints of the reliability of the seal and work efficiency in the sealing operation, it is preferable that the seal used is formed by, for example, molding the terminal portions of the pressure sensitive sensor including the vicinity of the terminals of the connecting means with a synthetic resin material from the outside, in a state in which the terminals of the electrodes are connected to the connecting means.

However, when molding is carried out by using a synthetic resin material, while the connecting means and the electrodes are coupled, the terminal portions of the pressure sensitive sensor are put into the interior of a mold or the like. In this state, molten synthetic resin material is injected to effect molding as in the case of injection molding. Therefore, there is the possibility that the pressure applied during injection of the synthetic resin material will cause the electrodes exposed from the end portion of the housing to contact each other and make electrical continuity.

In addition, there is the possibility that during molding, the molten synthetic resin material will enter the spaces between the electrodes and such that dead zones are formed in places in the pressure sensitive sensor.

Due to these possibilities, it has been difficult to actually carry out terminal processing by molding.

SUMMARY OF THE INVENTION

In consideration of the above facts, a first object of the present invention is to obtain a pressure sensitive sensor and a pressure sensitive sensor terminal processing method capable of ensuring reliability of a seal, improving work efficiency of the sealing operation and enhancing reliability of the sensor itself.

To attain the first object stated above, the pressure sensitive sensor in a first aspect according to the present invention comprises: an insulating housing having a hollow interior and open terminal portions, said housing being elastically deformable by an external force; a plurality of electrode held within said housing in a state in which at least one end of each of said electrodes is pulled out and the respective electrodes are set apart from one another with a space therebetween, said electrodes being deformed by an external force acting on said housing so as to contact one another to make electrical continuity; an insulating spacer provided to come in contact with said plurality of electrodes correspondingly to the inner terminal portions of said housing in which said spacer insulates said plurality of electrodes respectively; and an insulating seal sealing the terminal portions of said housing as well as said electrodes and said spacer.

According to the pressure sensitive sensor having the above structure, the terminal portions of the housing are sealed by the seal portion. Therefore, no foreign matter such as water droplets, enters the housing from the opening portions of the terminal portions, thus preventing erroneous operation. Here, a spacer is disposed between the plurality of electrodes at the terminal portions of the housing. This, even if external pressure (i.e., pressure from the exterior of the housing) acts thereon, the electrodes do not contact one another and thus do not make electrical continuity. For this reason, even if pressure acts on the housing when the terminal portions of the housing are sealed by the seal portion, this pressure does not cause the electrodes to contact each other. This makes it easy to form a seal portion by molding with, for example, a synthetic resin material, thereby making it possible to enhance work efficiency and to reduce costs.

The pressure sensitive sensor preferably comprises a support member supporting connecting portions which connect connecting means and said plurality of electrodes, said connecting means electrically connecting said plurality of electrodes to a determination means from sides of the terminal portions of said housing, said determination means determining whether said plurality of electrodes are contacting one another so as to make electrical continuity said support member together with said plurality of electrodes and said spacer being sealed by said seal.

According to the pressure sensitive sensor having the above structure, the support member which supports the connecting means for electrically connecting the electrodes and the determination means is, together with the electrodes and the spacer, sealed by the seal portion. Accordingly, no foreign matter such as water droplets adheres to the connecting portions of the electrodes and the connecting means at the support member, thus making it possible to prevent erroneous operation. Further, sealing by the seal portion enables improvement of corrosion-resistance and maintenance of the states of the electrical and mechanical connection.

Furthermore, as stated above, if the seal portion is formed by, for example, molding with synthetic resin material, and the synthetic resin material, when molten, is provided with viscosity and stickiness, then the seal portion supports the connecting portions of the support member from the outer side. In this sense as well, it is possible to maintain the state of mechanical connection.

Preferably, the support member is integral with the spacer in the pressure sensitive sensor.

According to the pressure sensitive sensor having the above structure in which the support member is integral with the spacer, the number of parts can be decreased and costs can be reduced. In addition, if the spacer is inserted between the electrodes from the terminal portion of the housing, the support member can be naturally arranged in the vicinity of the terminal portion. In this state, the support member has been positioned, and thus, the work efficiency in the assembly process improves.

A pressure sensitive sensor terminal processing method of a second aspect according to the present invention is a method for sealing terminal portions in a pressure sensitive sensor in which at least one end of each of a plurality of electrodes is pulled out and the plurality of electrodes are fixed, so as to be spaced apart from each other with a space therebetween, in an insulating housing whose interior is hollow and which is elastically deformed by external pressure and at which the terminal portions, which are open, are provided, the pressure sensitive sensor sensing external pressure by the plurality of electrodes being made to contact each other, due to the external pressure, so as to make electrical continuity, wherein disposing an insulating spacer in the space between said plurality of electrodes to come in contact with said plurality of electrodes correspondingly to the inner terminal portions of said housing in which said spacer insulates said plurality of electrodes respectively; and sealing the terminal portions of said housing as well as said spacer by an insulating seal member.

According to this pressure sensitive sensor terminal processing method, the terminal portions of the housing are sealed by the seal portion with the insulating spacer disposed between the plurality of electrodes. Therefore, even if pressure acts at the housing when the seal portion seals the terminal portions, the spacer limits the elastic deformation of the housing at the terminal portions, thereby preventing the electrodes from contacting one another during molding. As a result, it is possible to form the seal portion by, for example, molding with synthetic resin material, and to enhance work efficiency as well as to reduce costs.

It is preferable that in the pressure sensitive sensor terminal processing method, supporting connecting portions which connect a connecting means and said plurality of electrodes by a support member, said connecting means connecting said plurality of electrodes to a determination means from sides of the terminal portions of said housing, said determination means determining whether said plurality of electrodes are contacting one another so as to make electrical continuity, and sealing said support member as well as said housing and said spacer sealing by said seal member.

According to the pressure sensitive sensor terminal processing method having the above structure, the connecting members, which are electrically connected to the determination means, are electrically connected to the electrodes at the terminal portions of the housing, and the connecting portions are supported by the support member. In addition, in this supporting state, the support member as well as the housing and electrodes are sealed by the seal member. Therefore, no foreign matter such as water droplets adhere to the connecting portions, thereby making it possible to prevent erroneous operation. In addition, since the support member itself is sealed within the seal portion, corrosion resistance of the connecting portions improves and the state of electrical and mechanical connection can be maintained.

Further, as stated above, if the seal portion is formed by, for example, molding with synthetic resin material, and the synthetic resin material, when being molten, is provided with viscosity and stickiness, then the seal portion supports the connecting portions of the support member from with outer side. In this sense as well, the mechanical connecting state can be maintained.

It is preferable that in the pressure sensitive sensor terminal processing method, said support member is integral with said spacer, and said spacer is inserted from said terminal portions into the space between said plurality of electrodes such that said support member is disposed near said terminal portions.

According to the pressure sensitive sensor terminal processing method having the above structure, the support member is integral with the spacer, and the spacer is inserted between the electrodes from the terminal end portion of the housing, thereby installing the spacer and disposing the support member in the vicinity of the terminal portion. Here, due to the fact that the spacer is integral with the support member, if the spacer is inserted between the electrodes and is supported between the electrodes, the support member is also supported by the electrodes through the spacer outside the terminal portion. In this way, the support member can be made quasi-integral with the electrodes and the housing merely by inserting the spacer. Thus, the assembly process is facilitated. In addition, there is no need to support the housing and the support member separately during the sealing operation, thus making it possible to enhance the work efficiency of the sealing operation.

A second object of the present invention is to provide a pressure sensitive sensor and a pressure sensitive sensor manufacturing method in which inadvertent short-circuiting of the electrode wires outside the housing can be prevented.

To attain the aforementioned second object, a pressure sensitive sensor of the third aspect according to the present invention comprises: an insulating hollow housing elastically deformable by external pressure, at least four elongated electrode wires disposed within said housing so as to be set apart from one another in a direction substantially orthogonal to a longitudinal direction of said housing, each electrode wire having both longitudinal end portions thereof pulled out from said housing, said electrode wires together with said housing being bent by an external pressure acting on said housing such that said electrode wires can contact one another; a resistor which is disposed at ones of longitudinal direction end portions of said electrode wires and whose both terminals are electrically connected to each of two electrode wires out of said at least four electrode wires; connecting portions for connecting a longitudinal direction another end portion of one of the two electrode wires connected to said resistor to a longitudinal direction another end portion of one of at least two electrode wires unconnected to said resistor, and for connecting a longitudinal direction another end portion of another of the two electrode wires connected to said resistor to a longitudinal direction another end portion of another of the at least two electrode wires unconnected to said resistor; and an insulating support member provided on a side of said housing so as to correspond to the longitudinal direction one end portions of said electrode wires, partitioning the electrode wires connected to said resistor from the electrode wires unconnected to said resistor, and supporting the longitudinal direction one end portions of each of said electrode wires.

According to the pressure sensitive sensor having the above structure, in a normal state (i.e., a state in which no external pressure is acting on the housing), current flows from one of at least two electrode wires to which the resistor is not connected, through the connecting portions on the longitudinal direction other end portion of this electrode wire, to one of the two electrode wires to which the resistor is connected. Moreover, this current flows through the resistor to the other one of the two electrode wires to which the resistor is connected, and then flows through the connecting portions provided on the longitudinal direction other end portion of this electrode wire, to another one of the at least two electrode wires to which the resistor is not connected.

If external pressure is applied to the housing from the outside of the housing, the housing is elastically deformed, and some of or all of the at least four electrode wires provided within the housing are bent and relatively displaced in directions of approaching each other. As a result, some of the electrode wires contact each other and a short-circuit occurs. At this time, the current flowing through the electrode wires does not flow through the resistor. Accordingly, the current value of the current flowing to the other one of the at least two electrode wires to which the resistor is not connected differs from the current value in a case where current flows through the resistor (i.e., in a normal state). By detecting the variation in the current value, it is possible to detect whether an external pressure acts on the region at which the housing is provided (i.e., the region at which the pressure sensitive sensor of the present invention is provided).

The pressure sensitive sensor of the present invention comprises an insulating support member provided at one side of the housing. The support member partitions the electrode wires connected to the resistor from those which are not connected to the resistor. The electrode wires to which the resistor is connected and those to which the resistor is not connected are supported by the support members. Therefore, even if longitudinal direction one end portions of the electrode wires and their adjacent portions in the vicinity thereof are sealed by, for example, a mold or a seal, short-circuiting does not occur between the electrode wires to which the resistor is connected and those to which the resistor is not connected, at the respective longitudinal direction one end portions and portions in the vicinity thereof during the molding or sealing process.

A pressure sensitive sensor of a fourth aspect of the present invention comprises: an insulating hollow housing elastically deformable by external pressure; at least four elongated electrode wires disposed within said housing so as to be set apart from one another in a direction substantially orthogonal to a longitudinal direction of said housing, each electrode wire having both longitudinal end portions thereof pulled out from said housing, said electrode wires together with said housing being bent by an external pressure acting on said housing such that said electrode wires can contact one another; a resistor which is disposed at ones of longitudinal direction end portions of said electrode wires and whose both terminals are electrically connected to each of two electrode wires out of said at least four electrode wires; a pair of connecting portions, one of said connecting portions connecting a longitudinal direction another end portion of one of the two electrode wires connected to said resistor to a longitudinal another end portion of one of at least two electrode wires unconnected to said resistor, the other of the connecting portions connecting a longitudinal direction another end portion of the other one of the two electrode wires connected to said resistor to a longitudinal direction another end portion of another one of the at least two electrode wires unconnected to said resistor; and a support member provided between said pair of connecting portions on a side of said housing so as to correspond to the longitudinal direction other end portions of said electrode wires and supporting each of said pair of connecting portions while partitioning said pair of connecting portions from each other.

According to the pressure sensitive sensor having the above structure, in a normal state (i.e., a state in which no external pressure is acting on the housing), current flows from one of at least two electrode wires to which the resistor is not connected, through the connecting portions on the longitudinal direction other end portion of this electrode wire, to one of the two electrode wires to which the resistor is connected. Moreover, this current flows through the resistor to the other one of the two electrode wires to which the resistor is connected and then, through the connecting portions provided on the longitudinal direction other end portion of this electrode wire to another one of the at least two electrode wires to which the resistor is not connected.

If external pressure acts on the housing from the exterior of the housing, the housing is elastically deformed, and some of or all of the at least four electrode wires provided within the housing are bent and are displaced relatively in directions of approaching one another. As a result, some of the electrode wires contact each other, and a short-circuit occurs. At this time, the current flowing through the electrode wires does not flow through the resistor. Accordingly, the current value of the current flowing to the other one of the at least two electrode wires to which the resistor is not connected differs from the current value in a case in which current flows through the resistor (i.e., in a normal state). By detecting a variation in the current value, it is possible to detect whether external pressure acts on the region at which the housing is provided (i.e., the region at which the pressure sensitive sensor of the present invention is provided).

The pressure sensitive sensor of the present invention comprises an insulating support member provided on one side of the housing. The support member partitions longitudinal direction other end portions of the electrode wires connected by one of a pair of the connecting portions from the longitudinal direction other end portions of the electrode wires connected by the other connecting portion. The longitudinal direction other end portions of the respective electrode wires are supported by the support member. Therefore, even if the longitudinal direction other end portions of the electrode wires and portions in the vicinity thereof are sealed by, for example, a mold or a seal, short-circuiting does not occur between the electrode wires connected by one of the connecting portions and those connected by the other connecting portion, at the longitudinal direction other end portions and portions in the vicinity thereof.

In the pressure sensitive sensor, it is preferable that an engagement portion, which is engageable with the housing and couples the support member to the housing when engaged with the housing, is provided at the support member.

In the pressure sensitive sensor having the above structure, the engagement portion is provided at the support member, and the support member is coupled with the housing by the engagement portion engaging the housing. As a result, the housing is substantially integral with the support member, and the relative deformation of the support member with respect to the housing is limited. Consequently, no force such as tensile force is applied to the electrode wires after the support member has been made to support the electrode wires, thereby making it possible to prevent malfunctions, such as breaking of the electrode wires, during the manufacturing process.

In the pressure sensitive sensor, it is preferable that the engagement portion has insulating property and is inserted into the housing from an end portion of the housing.

According to the pressure sensitive sensor with the above structure, the housing is coupled to the support member by inserting the engagement portion into the housing from an end portion of the housing.

Here, according to the pressure sensitive sensor of the present invention, the engagement portion is inserted into the interior of the housing from an end portion of the housing. Therefore, for example, the synthetic resin material for forming the mold or seal for sealing the support member and the end portions of the electrode wires is limited or prevented from entering into the housing. Further, even if the regions in the vicinity of the end portions of the housing are forcibly bent or curved when treating the leads connected to the electrode wires, no short-circuiting occurs in the vicinities of the end portions of the housing.

It is preferable that the sensor comprises a seal portion for sealing the support member and for sealing a region between the support member and the housing.

According to the pressure sensitive sensor with the above structure, the support member is sealed by the seal portion, and the seal portion can seal the end portions of the housing. Therefore, it is possible to protect the support member and regions in the vicinities of the end portions of the electrode wires from inadvertent external forces. Breaking of wires can be prevented, and entry into the housing of droplets or the like from the end portions of the housing can be prevented.

In the pressure sensitive sensor, the electrode wires are preferably arranged substantially helically within the interior of the housing in the longitudinal direction of the electrode wires.

According to the pressure sensitive sensor with the above structure, since the electrode wires are arranged substantially helically within the housing, it is possible to prevent short-circuiting of the electrode wires through the resistor when an external force acts on the housing. It is therefore possible to enable the sensor to more reliably detect that an external force is acting on the housing.

The fifth aspect of the present invention is a method for manufacturing a pressure sensitive sensor in which at least four electrode wires are disposed so as to be set apart from one another in a direction substantially orthogonal to a longitudinal direction of said electrode wires within a hollow insulating housing which can be deformed elastically by external pressure, said pressure sensitive sensor sensing that external pressure has been applied to said housing due to said electrode wires contacting each other so as to make electrical continuity, said method comprising the steps of: pulling out both end portions of said plurality of electrode wires from said housing; providing an insulating support member at an outer side of said housing correspondingly to at least ones of the both end portions of said plurality of electrode wires pulled out from said housing; providing a plurality of electrically conductive connecting members correspondingly to the both end portions of said plurality of electrode wires, causing said support member to support a plurality of connecting members at a side corresponding to said support member out of the plurality of connecting members while said connecting members at a side corresponding to said support member are partitioned by said support member, and connecting said plurality of electrode wires in series by said plurality of connecting members.

In the pressure sensitive sensor manufacturing method having the above structure, first, at least four electrode wires are arranged so as to be set apart from one another in directions substantially orthogonal to the longitudinal directions thereof in a state in which the both longitudinal end portions are pulled out from the housing. Next, an insulating support member is disposed so as to correspond to at least one end portions of the both end portions of the electrode wires, and a plurality of conductive connecting members are provided so as to correspond to the both end portions of the electrode wires. Among the plurality of connecting members, those at the side at which the support member is provided are supported by the support member while being partitioned by the support member. Therefore, at the side at which the support member is provided the connecting members partitioned by the support member do not contact one another and thus do not make electrical continuity. Further, both end portions of the electrode wires are electrically connected to these connecting members, and the electrode wires are connected in series. Therefore, if external pressure is applied to the housing and the housing as well as the electrode wires therein elastically deform, the electrode wires are contact each other and short-circuiting occurs. By detecting a variation in a current value which variation accompanies a variation in the resistance value in the short-circuited state, it is possible to detect that an external pressure is acting on the housing.

Here, in the pressure sensitive sensor manufacturing method of the present invention, as described above, at the side at which the support member is provided, the plurality of connecting members are supported by the support member while being partitioned by the support member. Therefore, the connecting members partitioned by the support member do not contact with one another and thus do not make electrical continuity. Accordingly, on the support member side, the electrode wires connected to different connecting members do not contact one another and do not make electrical continuity. For this reason, even if the longitudinal direction one end portions of the electrode wires and portions in the vicinity thereof are sealed by a mold, a seal or the like, the end portions of the electrode wires pulled out during the molding or sealing step, do not short-circuit, thus facilitating the molding or sealing step.

In the present invention, the support member may be disposed so as to correspond to one longitudinal direction end portions of the electrode wires or so as to correspond to both longitudinal direction end portions of the electrode wires.

The pressure sensitive sensor manufacturing method preferably comprises the steps of: displacing said plurality of connecting members at the side at which said support member is provided, in directions intersecting a direction of pulling out the end portions of said plurality of electrode wires pulled out from said housing toward the side at which said support member is provided; forming a plurality of opening portions in said support member, said opening portions having one opening end portion facing one of said plurality of connecting members in an opening direction of the one opening end portion and other opening end portions opening at a side opposite to said facing connecting member via said support member; and making one of a pair of electrodes for welding approach a connecting member out of said plurality of connecting members, from a side opposite to the connecting member, inserting another electrode for welding into one of said opening portions corresponding to the connecting member to be welded so as to make said another electrode for welding approach the connecting member to be welded, and energizing and then welding the connecting member to be welded with the connecting member to be welded held between said pair of electrodes for welding.

According to the pressure sensitive sensor manufacturing method having the above structure, the plurality of connecting members at the side at which the support member is provided are supported by the support member while being displaced in directions intersecting the direction in which the end portions are pulled at this side. Further, an opening portion is formed in the support member along the direction for partitioning the respective connecting members (i.e., along the direction from one connecting member to another connecting member partitioned by the support member). This opening portion has one opening end facing the connecting member at this opening end side in the opening direction thereof. On the other hand, as described above, one connecting member and the other connecting member are displaced in directions intersecting the direction in which the end portions of the electrode wires are pulled out. Therefore, the other opening end is displaced, with respect to the connecting member at this opening end side, in a direction intersecting the direction of pulling out the electrode wires.

One of a pair of electrodes for welding is made to approach one connecting member from a side opposite to the opening portion having the one opening and facing the connecting member. The other welding electrode is inserted into the other opening end of the opening portion and is made to approach the connecting member. While the connecting members are being held between the both welding electrodes, resistance welding is conducted. The connecting members are thereby made integral with the electrode wires connected to the connecting members.

Here, according to the pressure sensitive sensor manufacturing method of the present invention, although the support member is made of an insulating material, an opening portion is formed in the support member and the other electrode of the pair of electrodes for welding is inserted into this opening portion, whereby the connecting members are held between the pair of electrodes for welding. Therefore, the connecting members can be connected to the electrode wires by resistance welding. In addition, a method in which the support member as well as the connecting member are held between a pair of electrodes for welding while a portion of the support member is made conductive may be considered. However, in this case, the support member must be endowed with strength enough to withstand, for example, the holding force of the pair of welding electrodes. As stated above, according to the pressure sensitive sensor manufacturing method of the present invention, the connecting members are held between a pair of welding electrodes, but the support member is not held therebetween. Therefore, there is no need to endow the support member with particularly high strength. This allows more latitude in the selection of materials for the support member, and costs can be reduced. As mentioned above, the one connecting member and the other connecting members, which are partitioned by the support member, are displaced in a direction intersecting the direction in which the end portions of the electrode wires are pulled out from the housing. Therefore, the other opening end of the opening portion is located at a position which has been displaced with respect to the electrode wires and the connecting member on this opening end side. As a result, the electrode wires and connecting members on the other opening end portion side of the opening portion are not a hindrance to insertion of the welding electrodes from the other opening end of the opening portion, and the welding operation is thus facilitated.

DESCRIPTION OF THE PREFERRED EMBODIMENTS

Figure 7:
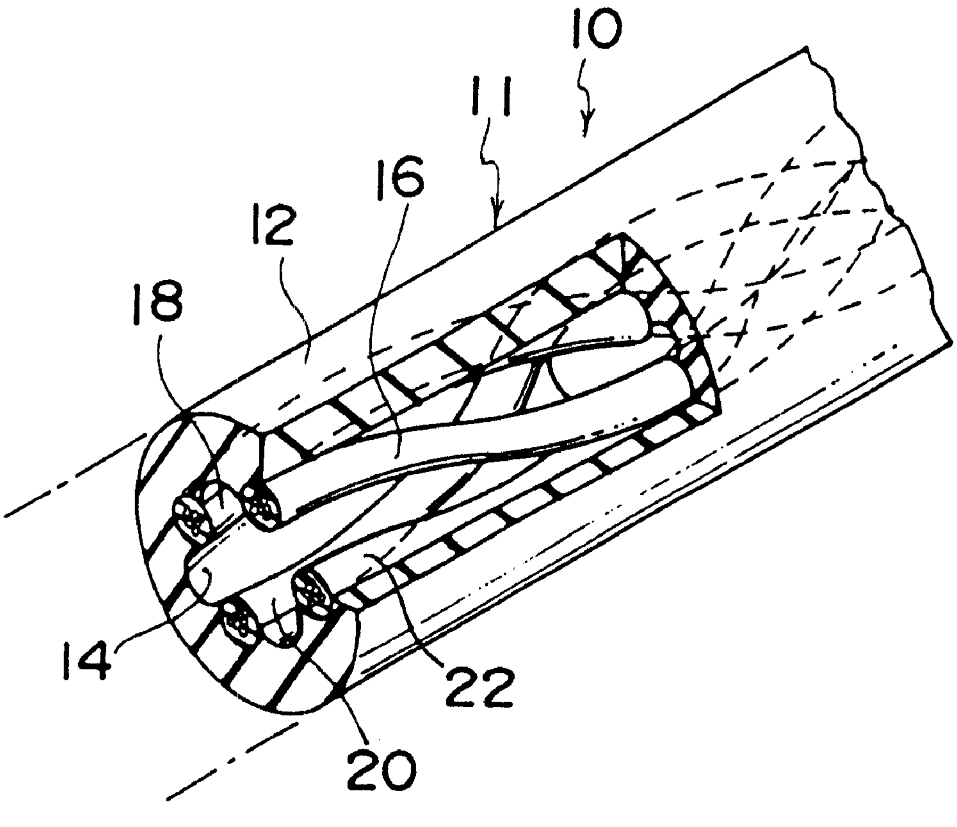
FIG. 7 is a perspective view showing the structure of a sensor main body.
Figure 8:
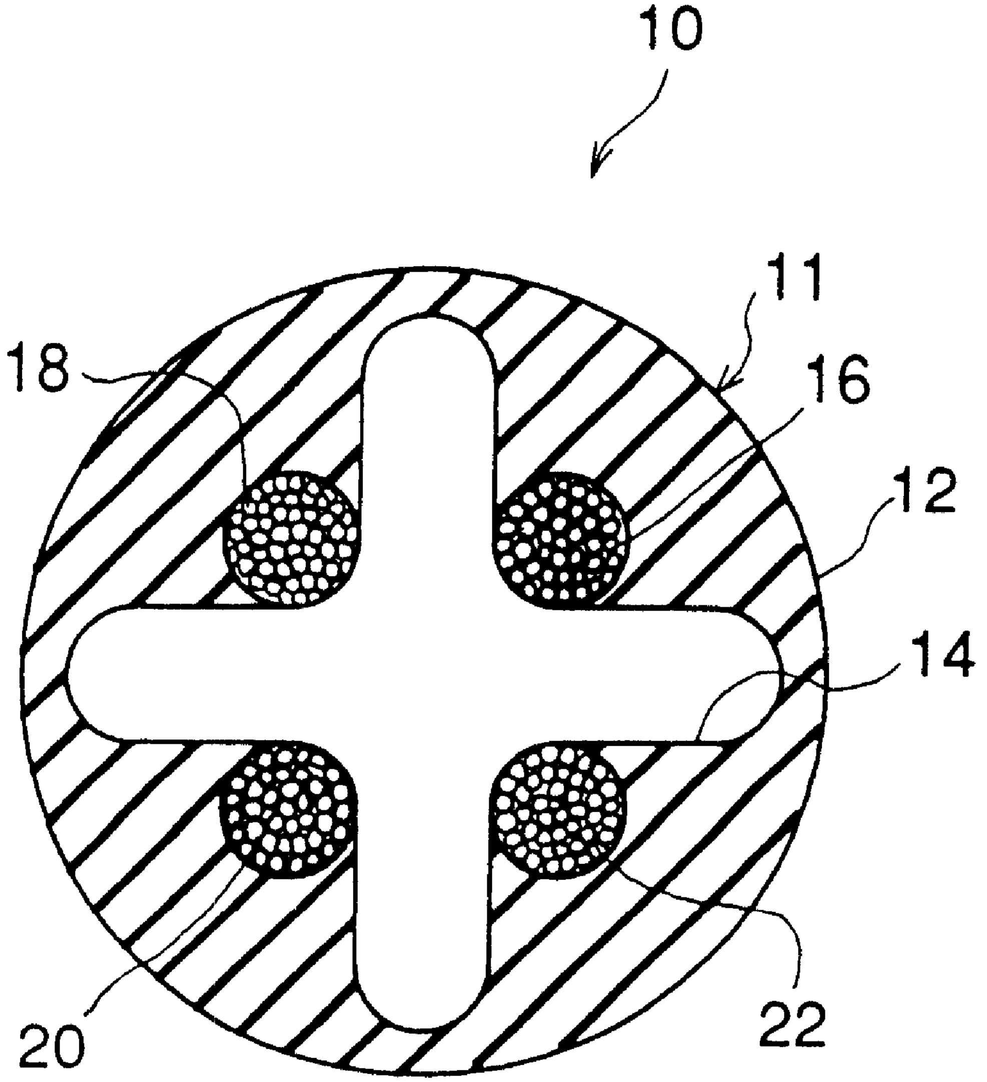
FIG. 8 is a cross-sectional view showing the structure of the sensor main body.

FIG. 7 is a perspective view of the structure of a pressure sensor main body 11 of a pressure sensitive sensor 10 in the first embodiment according to the present invention. As shown in FIG. 7, the sensor main body 11 of the pressure sensitive sensor 10 in this embodiment comprises a long housing 12 formed from an insulating rubber material such as silicone rubber, ethylene-propylene rubber, styrene-butadiene rubber and chloroprene rubber or of insulating elastic material such as polyethylene, ethylene-vinyl acetate, ethylene ethyl acrylate copolymer, ethylene methyl methacrylate copolymer, polyvinyl chloride, olefin series or styrene series thermoplastic elastomer. As shown in FIG. 8, a cross hole 14 having a cross-shaped section is formed in the housing 12 in the longitudinal direction of the housing 12. The cross hole 14 is gradually deformed around the center of the housing 12 in the longitudinal direction of the housing 12. In addition, electrode wires 16, 18, 20 and 22 of long string, flexible type formed by twining conductive threads such as copper wires are provided within the housing 12. The electrode wires 16 to 22 are arranged to be distant from one another through the cross hole 14 in the vicinity of the center of the hole 14, arranged helically along the cross hole 14 and firmly adhere integrally to the inner peripheral portion of the cross hole 14. If, therefore, the cross hole 14 is elastically deformed, the electrode wires 16 to 22 are bent. Particularly, if the housing 12 is elastically deformed to such an extent that the cross hole 14 is squashed, some of or all of the electrode wires 16 to 22 contact with one another and make electrical continuity. If the cross hole 14 recovers its original shape, the electrode wires 16 to 22 also recover their original shapes.

Figure 9:
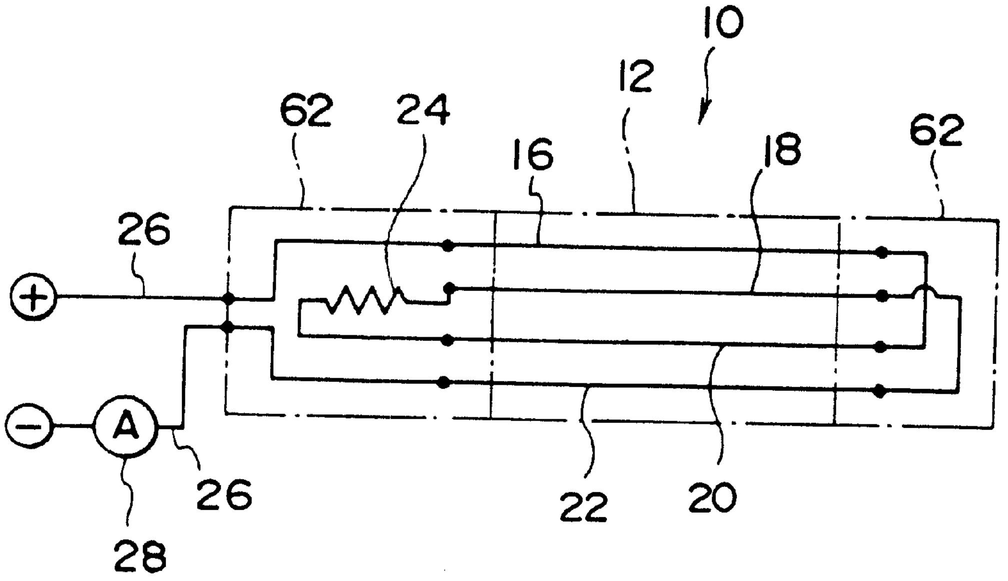
FIG. 9 is a circuit diagram showing the schematic structure of the pressure sensitive sensor.

As shown in the circuit diagram of FIG. 9, in the pressure sensitive sensor 10 in this embodiment, the electrode wires 16 and 22 make electrical continuity at longitudinal one end portions thereof. The electrode wires 18 and 22 make electrical continuity at longitudinal one end portions thereof, as well. The electrode wires 20 and 18 make electrical continuity at longitudinal other end portions thereof through a resistor 24. Further, the electrode wires 16 and 22 are connected to the power supply through a cord 26 at longitudinal other end portions thereof. The electrode wire 22 is, however, connected to the power supply through current value detection means 28 serving as determination means such as a current detection device for cutting off a circuit when current of a predetermined value or higher flows. That is, current flowing across the electrode wire 22, through the electrode wires 18 and 20, from the electrode wire 16 normally flows through the resistor 24. If the housing 12 is squashed and either the electrode wire 16 or 20 make electrical continuity with the electrode wire 18 or 22 and short-circuits, then current does not flow through the resistor 24. Due to this, if current flows to this circuit with certain voltage, a current value varies. The pressure sensitive sensor 10 in this embodiment therefore has a structure capable of detecting whether or not the housing 12 is squashed, that is, an external force acts on the sensor 10 by detecting a variation in the current value at this time. In this case, if a short-circuit occurs between the electrode wires 16 and 18 or between the electrode wires 20 and 22, then current flows via the resistor 24. With such a structure, an external force cannot be detected. Nevertheless, the electrode wires 16 to 22 are arranged helically within the housing 12 as described above. For that reason, if an external force from the same direction continuously acts on a range, for example, from a predetermined region within the housing 12 to a region substantially half round from the predetermined region along the longitudinal direction of the housing 12, then all of the electrode wires 16 to 22 contact one another. The range in which either the electrode wire 16 or the electrode wire 20 contacts either the electrode wire 18 or 22 while the electrodes wires 16 and 18 contact each other or the electrode wires 20 and 22 contact each other, can be more narrow than that from the predetermined region within the housing 12 to that substantially half around from the predetermined region. It is quite unlikely that only the electrode wires 16 and 18 or the electrode wires 20 and 22 contact with each other. For that reason, the pressure sensitive sensor in the embodiment is substantially certainly capable of detecting an external force.

Figure 1:
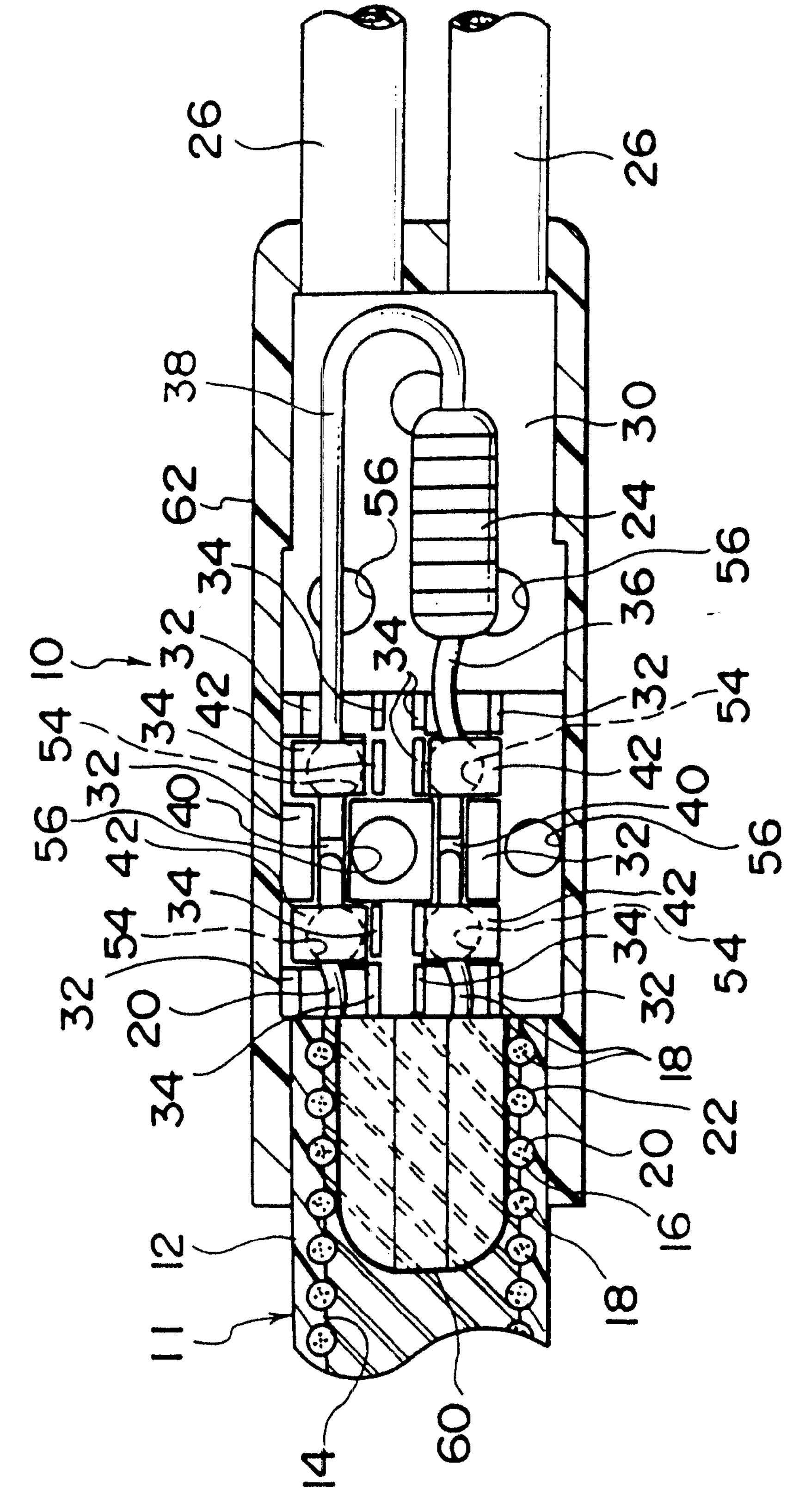
FIG. 1 is a plan cross-sectional view showing the structure of a terminal portion of a pressure sensitive sensor in a first embodiment according to the present invention.
Figure 2:
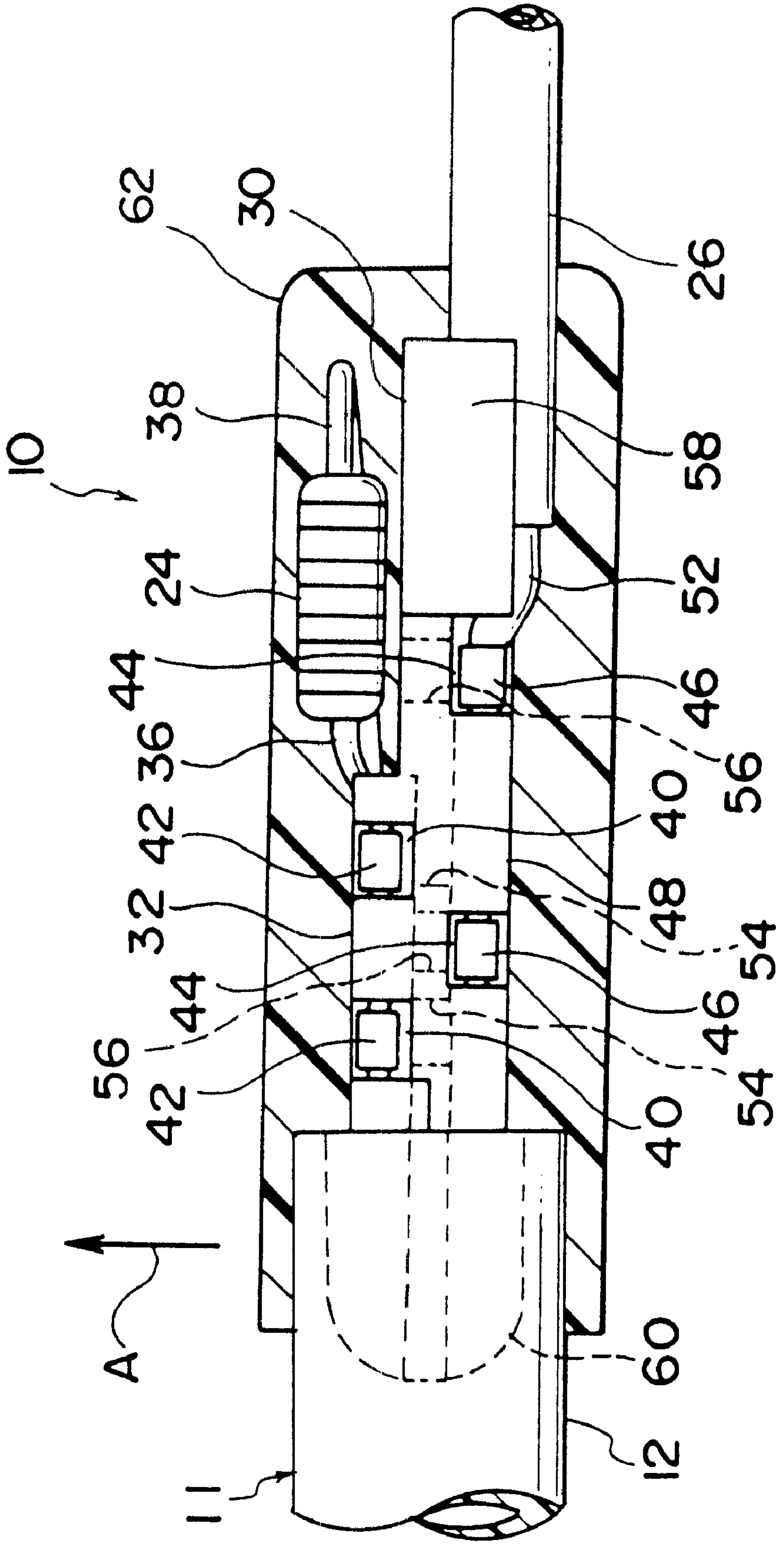
FIG. 2 is a side cross-sectional view showing the structure of the terminal portion of the pressure sensitive sensor in the first embodiment according to the present invention.

As shown in FIGS. 1 and 2, a support member 30 is provided on the longitudinal one end portion of the housing 12. The width of the support member 30 is equal to or slightly larger than the outer diameter of the housing 12. The thickness of the support member 30 is smaller than the outer diameter of the housing 12. The support member 30 is thus plate-like and is made of, for example, hard and insulating synthetic resin material. The above-stated resistor 24 is provided on a surface opposite to the housing 12 with respect to the longitudinal intermediate portion of the support member 30 (in the direction of arrow A of FIG. 2). Two pairs of vertical walls 32 and 34 are provided on the housing 12 side surface with respect to the longitudinal intermediate portion of the support member 30 in parallel in the widthwise direction of the support member 30. The distance between the vertical walls 32 and 34 are set to be equal to or lager than a distance allowing leads 36 and 38 extending from longitudinal one end portions of the electrode wires 18 and 20 and from both end portions of the resistor 24 to be arranged.

A pair of conductive pieces 40 serving as connecting members are provided between the vertical walls 32 and 34 on the front face of the support member 30 (i.e., on the side on which the resistor 24 is provided). Each of the conductive piece 40 is a thin and narrow plate-like piece made of conductive material such as metal. If the electrode wire 18 and the lead 36 are fitted into the vertical wall 32 and contact one of the conductive pieces 40, electricity flows between the electrode wire 18 and the lead 36. If the electrode wire 20 and the lead 38 are contacted with the other conductive piece 40 with the wire 20 and the lead 38 arranged between the vertical walls 32 and 34, then electricity flows between the electrode wire 20 and the lead 38. As a result, the electrode wire 18 is electrically connected to the electrode wire 20 via the resistor 24.

Wide caulking portions 42 are also formed on both end portions of the conductive piece 40, respectively. The conductive pieces 40 can be fixed to the support member 30 in a state in which the electrode wires 18, 20 and the leads 36, 38 make electrical continuity by caulking and welding the caulking and welding portion 42 to encompass the electrode wires 18, 20 or the leads 36, 38.

On the other hand, a pair of vertical walls 48 and a vertical wall 50 between the vertical walls 48 are provided in parallel on the back face of the support member 30 in the longitudinal direction of the support member 30. The distance between the vertical walls 48 and 50 is set at not less than a distance which allows the electrode wires 16 and 22 to be arranged. The distance between the vertical walls 48 and 50 on the cord 26 side is larger than that between the electrode wires 16 and 22. Conductive portion 52 of the cord 26 larger than the electrode wires 16 and 22 can be arranged between the vertical walls 48 and 50.

Vertical walls 58 are provided from both end portions of the one end portion side of the support member 30 in the width direction of the member 30 with respect to the vertical walls 48 and 50. The vertical walls 58 contact the housing portion of the cord 26 with the conductive portion 52 provided between the vertical grooves 48 and 50. Due to the vertical wall 58 contacting the housing portion of the cord 26, excessive bending of the conductive portion 52 at portions which are not covered by the housing is prevented.

A pair of conductive pieces 44 serving as connecting members are provided between the vertical walls 48 and 50. Each conductive piece 44 is a narrow and thin plate-like piece made of conductive material such as metal as in the case of the above-state conductive piece 40. A caulking portion 46 corresponding to the caulking portion 42 of the conductive piece 40 is formed on each of both end portions of the piece 44. By caulking and welding the caulking portions 46 to surround the electrode wires 16, 22 or both of the conductive portions 52, the electrode wires 16, 22 and the conductive portions 52 thereof can be fixed to the support member 30 while the wires 16, 22 and the conductive portions 52 make electrical continuity.

The vertical walls 32, 34 and 48, 50 are formed such that the caulking portion 46 of the conductive piece 44 is not disposed at a position facing the caulking portion 42 of the conductive piece 40 in the thickness direction of the support member 30 and such that the caulking portion 46 is disposed so as to be deformed with respect to the caulking portion 42 in the width direction of the support member 30.

In addition, a plurality of transparent holes 54, 56 serving as opening portions passing through the support member 30 in the thickness direction thereof are formed in the support member 30. One opening end of the transparent hole 54 faces the caulking portion 42 along the opening direction thereof (that is, if the interior of the transparent hole 54 is observed from the other opening end in the axial direction of the hole 54, the caulking portion 42 can be seen). One opening end of the transparent hole 56 faces the caulking portion 46 in the opening direction thereof (that is, if the interior of the transparent hole 56 is observed from the other opening end in the axial direction of the hole 56, the caulking portion 46 can be seen). As stated above, the caulking portion 46 is deformed along the width direction of the support member 30 with respect to the caulking portion 42 and the transparent hole 56 is deformed along the width direction of the support member 30 with respect to the transparent hole 54. Due to this, the transparent hole 56 does not overlap with the transparent hole 54 and the other opening end portions of the transparent holes 54 and 56 do not face the caulking portion 46 and 42 in the opening direction thereof.

Figure 4:
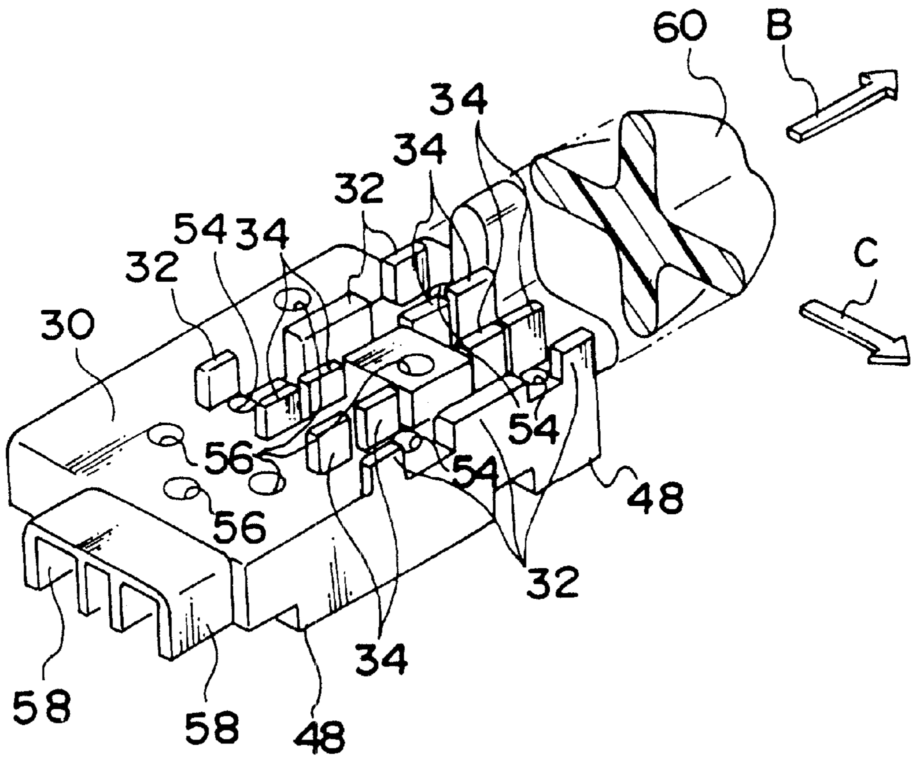
FIG. 4 is a perspective view of a support member.

A spacer 60 serving as an engagement portion is also provided to extend from the end portion of support member 30 on the sensor main body 11 side. As shown in FIG. 4, the spacer 60 has a cross-shaped section. The spacer 60 is tapered such that dimensions from the center of the cross to the tip end portion in the width direction (i.e., the direction of arrow C in FIG. 4) are gradually smaller from the central portion in the axial direction (i.e., the direction of arrow B in FIG. 4) to the axial tip end portion. The dimension of the proximal end portion of the spacer 60 corresponds to the cross hole 14. If the spacer 60 is inserted into the cross hole 14 from the terminal portion of the housing 12 until the sensor main body 11 side-end portion of the support member 30 contacts the end portion of the housing 12, the spacer 60 buries the cross hole 14 in close proximity to the end portion of the housing 12. Even if the housing 12 is pressed in the direction of the thickness of the spacer 60 with the spacer 60 being inserted, the electrode wires 16 to 22 are prevented from contacting one another by the spacer 60. In the pressure sensitive sensor 10, the portion of the terminal portion of the housing 12 into which the spacer 60 is inserted thereby becomes a dead zone.

Figure 3:
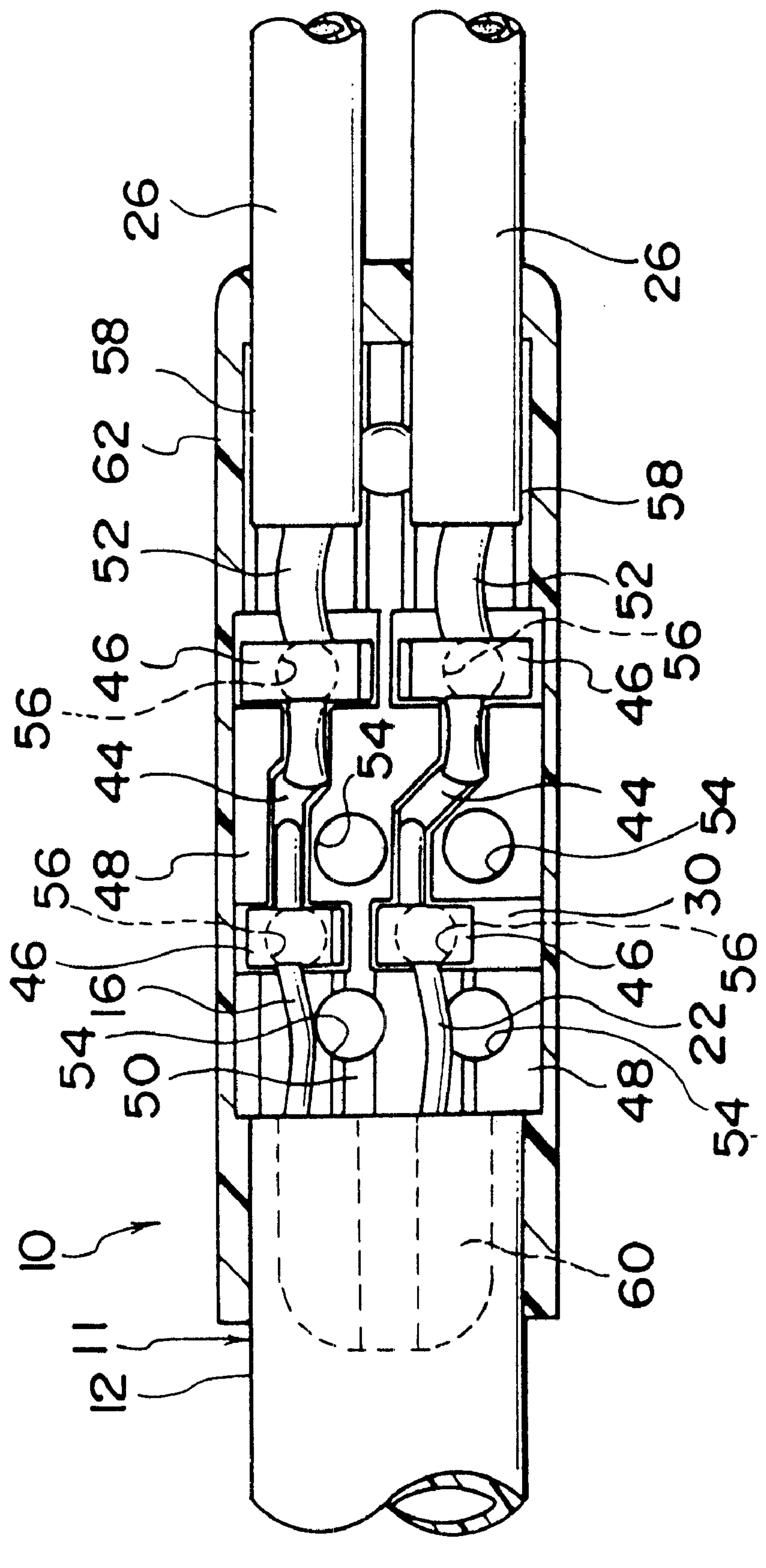
FIG. 3 is a bottom cross-sectional view showing the structure of the terminal portion of the pressure sensitive sensor in the first embodiment according to the present invention.

Moreover, as shown in FIGS. 1 through 3, a seal 62 is formed at the terminal portion of the housing 12. The seal 62 is made of insulating material, such as thermoplastic synthetic resin and rubber material, which becomes a fluid, such as a liquid or a sol when heated. The seal 62 covers and integrates the portion near the terminal portion of the housing 12, the entire portion of the support member 30 and the portion of the cord 26 near the support 30. The terminal portion of the housing 12 as well as the support member 30 are thus sealed. (The following description is of a case where a synthetic resin material is used for the material of the seal 62. However, this does not mean that other materials such as a rubber material cannot be used for the seal 62.) The seal 62 is provided from the portion near the terminal portion of the housing 12 to the portion of the cord 26 near the support member 30 and cured while the synthetic resin material is being melted, as will be later described in detail. Due to this, the synthetic resin material enters small clearances around the respective members such as the resistor 24, and the respective members are supported at predetermined positions.

Figure 5:
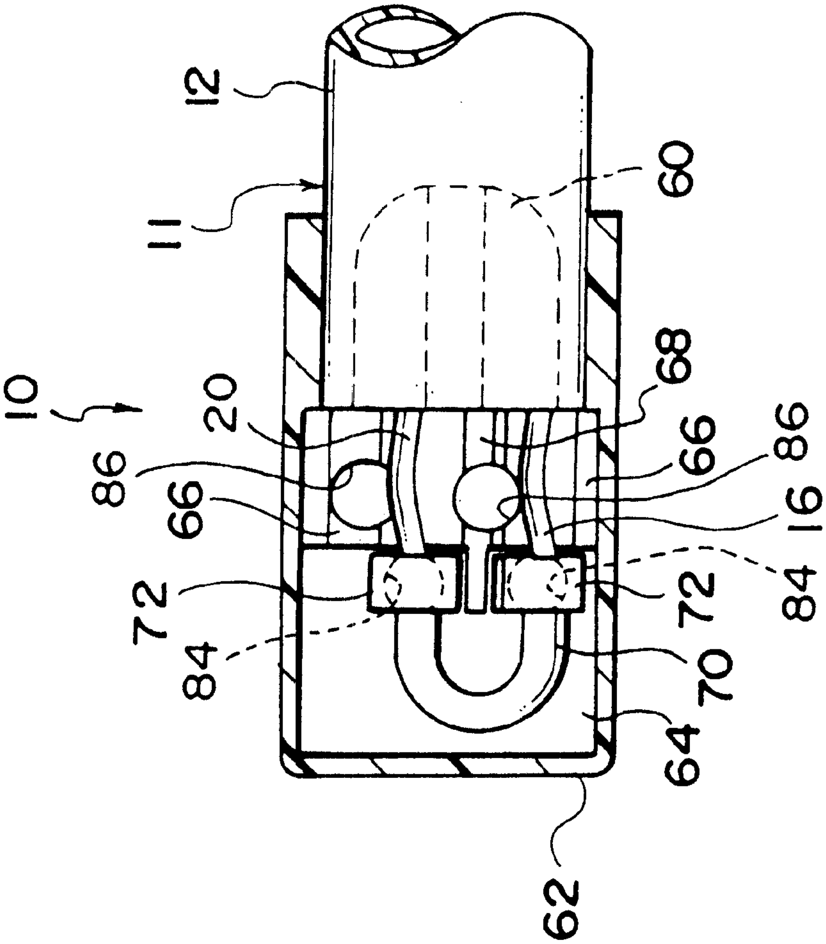
FIG. 5 is a plan cross-sectional view showing the structure of the other terminal portion of the pressure sensitive sensor in the first embodiment according to the present invention.
Figure 6:
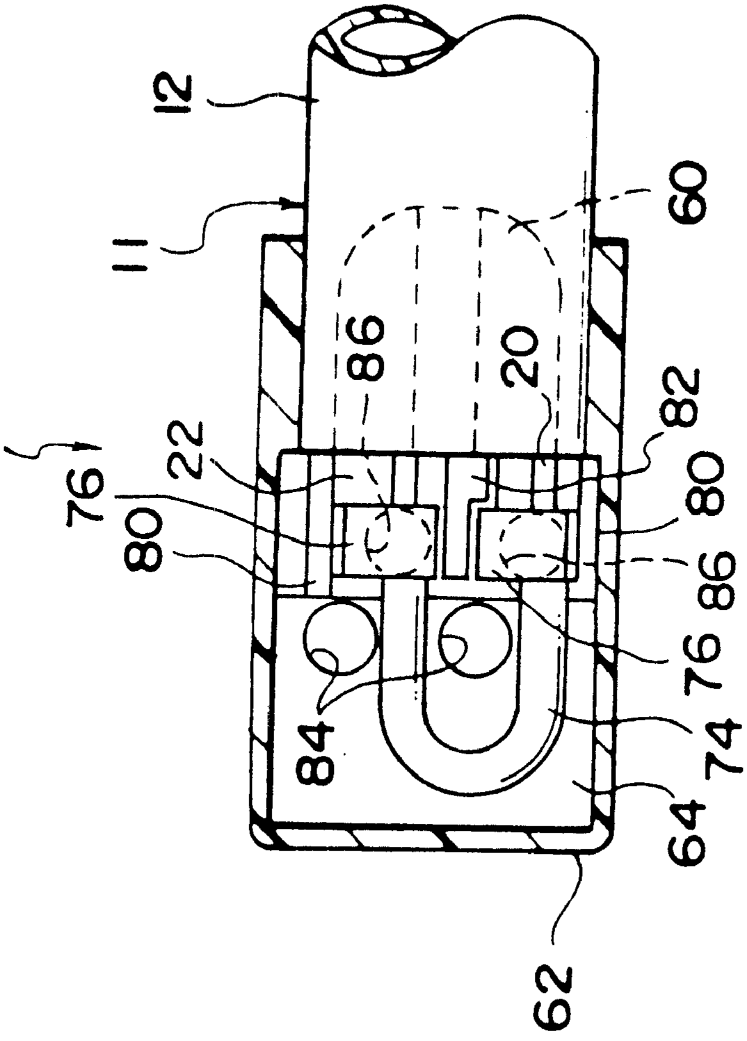
FIG. 6 is a bottom cross-sectional view showing the structure of the other terminal portion of the pressure sensitive sensor in the first embodiment according to the present invention.

As shown in FIGS. 5 and 6, a support member 64 is provided at the longitudinal other terminal portion of the housing 12. Like the support member 30, the support member 64 is a thin plate-like member having a width equal to or slightly larger than the outer diameter of the housing 12 and a thickness smaller than the outer diameter of the housing 12. The support member 64 is made of, for example, a hard and insulating synthetic resin material. A vertical wall 68 provided between a pair of vertical walls 66 is arranged in parallel to the longitudinal direction of the support member 64 on the front surface of the support member 64. The distance between the vertical walls 66 and 68 is set to be not less than a distance which allows the longitudinal other end portions of the electrode wires 16 and 20 pulled from the terminal portion of the housing 12 to be arranged. A thin plate-like conductive piece 70 is provided on the support member 64 to serve as a connecting member. The conductive piece 70 is substantially U-shaped and made of a conductive material such as metal. Both end portions of the U-shape piece 70 are positioned between the vertical walls 66 and 68. Wide caulking portions 72 are formed on both end portions of the conductive piece 70, respectively and fixed to the support member 64 with the electrode wires 16 and 20 electrically connected by caulking and welding the caulking portions 72 to encompass the electrode wires 16 and 20.

A vertical wall 82 provided between the paired vertical walls 80 is arranged in parallel to the longitudinal direction of the support member 64 on the back face side of the support member 64. The distance between the vertical walls 80 and 82 is set to be not less than a distance which allow the longitudinal other end portions of the electrode wires 18 and 22 pulled out from the terminal end portion of the housing 12 to be arranged. A conductive piece 74 serving as a connecting member is provided on the back of the support member 64. The conductive piece 74 can be fixed to the support member 64 with the electrode wires/8 and 20 electrically connected, by caulking and welding the caulking portions 76 formed at the conductive piece 74 to encompass the electrode wires 18 and 22.

Here, the vertical walls 66, 68 and 80, 82 are formed such that the caulking portion 76 of the conductive piece 74 is not disposed at a position facing the caulking portion 72 of the conductive piece 70 in the thickness direction of the support member 64 but is disposed so as to be deformed in the width direction of the support member 64 with respect to the caulking portion 72.

A plurality of transparent holes 84 and 86 are formed in the support member 64 to serve as opening portions passing through the support member 64 in the thickness direction of the member 64. One opening end portion of the transparent hole 84 faces the caulking portion 72 in the opening direction (that is, if the interior of the transparent hole 84 is observed from the other opening end portion of the transparent hole 84 in the axial direction, the caulking portion 72 can be seen). One opening end portion of the transparent hole 86 faces the caulking portion 76 in the opening direction (that is, if the interior of the transparent hole 86 is observed from other opening end portion of the transparent hole 86 in the axial direction, the caulking portion 76 can be seen). As stated above, the caulking portion 76 is displaced in the widthwise direction of the support member 64 with respect to the caulking portion 72, whereas the transparent hole 86 is displaced in the width direction of the support member 64 with respect to the transparent hole 84. The transparent hole 84 and 86 do not overlap with each other and other opening end portions of the transparent holes 84 and 86 do not face the caulking portions 76 and 72, respectively.

In addition, a spacer 60 is formed at the sensor main body 11 side-end portion of the support member 64. The spacer 60 is inserted into the cross hole 14. A seal 62 is provided in the vicinity of the other terminal portion of the housing 12 and around the support member 64. The seal 62 seals the other terminal portion of the housing 12 and the support member 64, whereby the housing 12 is fully integral with the support member 64.

Next, the terminal processing method for the pressure sensitive sensor 10 will be described by way of the assembly method for the sensor 10. The functions and advantages of the present embodiment will be described as well.

Figure 10:
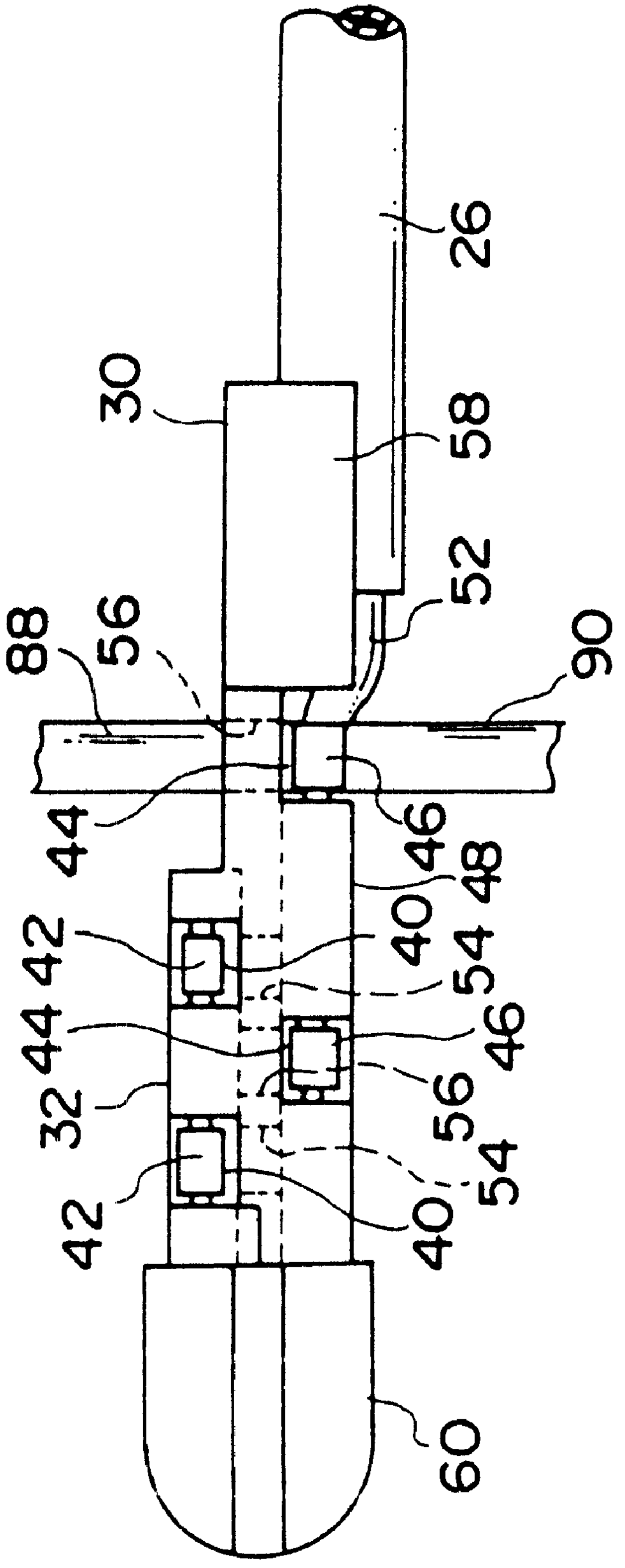
FIG. 10 is a side view showing a state in which a cord is resistance-welded to a connecting member.

In assembling the pressure sensitive sensor 10, end portions of a pair of cords 26 are arranged between the vertical walls 48 and 50 on the caulking portion 46 of the conductive pair 44 before the portion 46 is caulked. In this state, as shown in FIG. 10, an electrode 90 for resistance welding is put closer to the caulking portion 46 and the cord 26 from the side opposite to the supporting member 30 through the caulking portion 46 and the end portion of the cords 26. At the same time, an electrode 88 paired with the electrode 90 for resistance welding is put closer to the caulking portion 46 and the cords 26 by inserting the electrode 88 from the other opening end portion into the interior of the transparent hole 56 corresponding to the caulking portion 46 approached by the electrode 90. The caulking portion 46 and the end portions of the cords 26 are held between the electrodes 90 and 88 and current is applied between the electrodes 90 and 88. Using resultant resistance heat, the caulking portion 46 and the end portions of the cords 26 are welded to be integral with each other.

Figure 11:
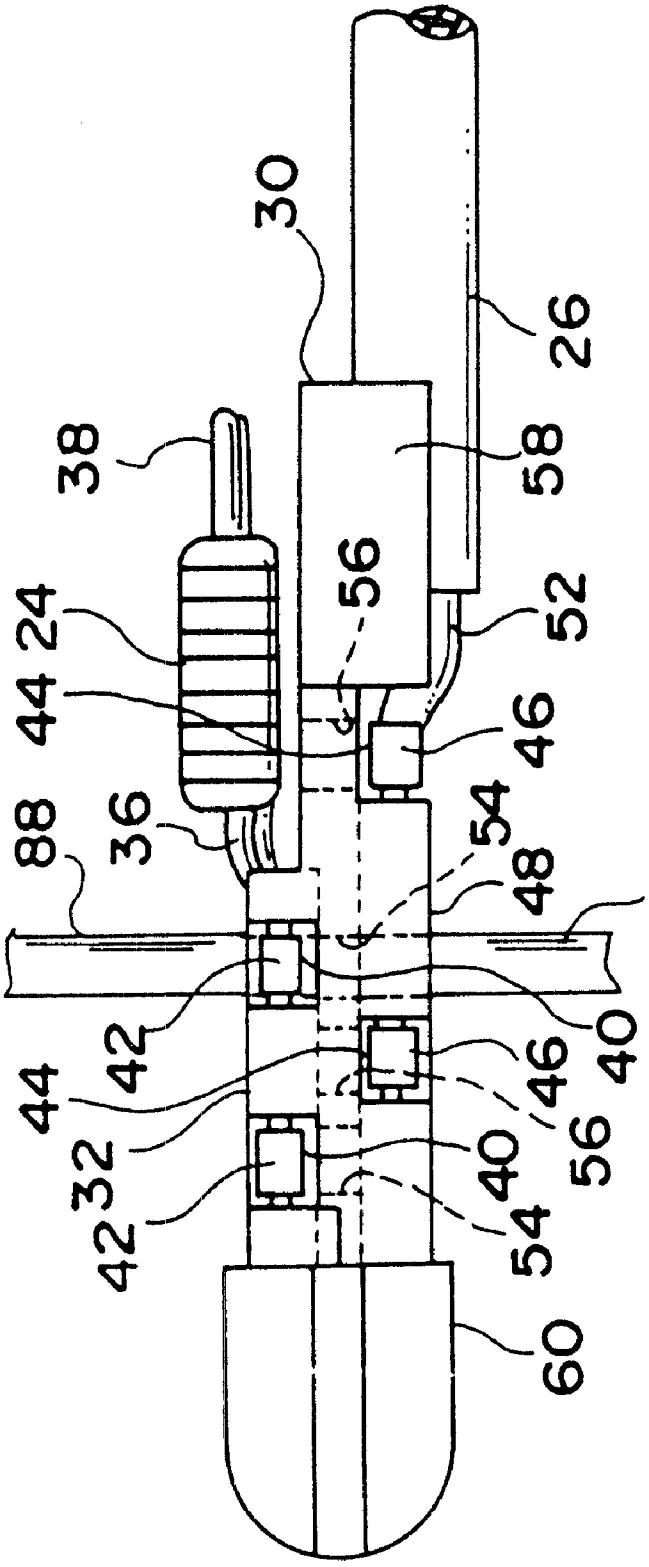
FIG. 11 is a side view showing a state in which a lead of a resistor is resistance-welded to the connecting member.

As shown in FIG. 11, the electrode 88 is made to approach the caulking portion 42 and the lead 36 or 38 of the resistor 24 from the side opposite to the support member 30 through the caulking portion 42 and the leads 36 and 38. At the same time, the electrode 90 is made to approach the caulking portion 42 and the lead 36 or 38 by inserting the electrode 90 into the interior of the transparent hole 54 corresponding to the caulking portion 42 approached by the electrode 88 from the other opening end portion of the hole 54. The caulking portion 42 and the lead 36 or 38 are held by the electrodes 88 and 90. The caulking portion 42 is caulked by the holding force and current is applied between the electrodes 88 and 90. Using the resultant resistance heat, the caulking portion 42 and the lead 36 or 38 are welded to-become integral with each other.

In the support member 30 thus equipped with the lead 36 and the resistor 24, the spacer 60 is inserted from longitudinal one end portion of the sensor main body 11 into the cross hole 14. When the spacer 60 is inserted into the cross hole 14 until the sensor main body 11 side-end portion of the support member 30 contacts the end portion of the sensor main body 11, the cross hole 14 is closed by the spacer 60 in the vicinity of the end portion of the sensor main body 11. In this state, the spacer 60 is supported by the housing 12 within the cross hole 14, thereby limiting the spacer 60 from inclining with respect to the axial direction of the housing 12 and from being displaced in the radial direction of the housing 12. In this state, therefore, as long as the support member 30 is not displaced toward the side of the one end of the housing 12 in the axial direction (i.e., the pulling direction) to pull the spacer 60 from the cross hole 14, the support member 30 and the sensor main body 11 are substantially integral with each other.

Figure 12:
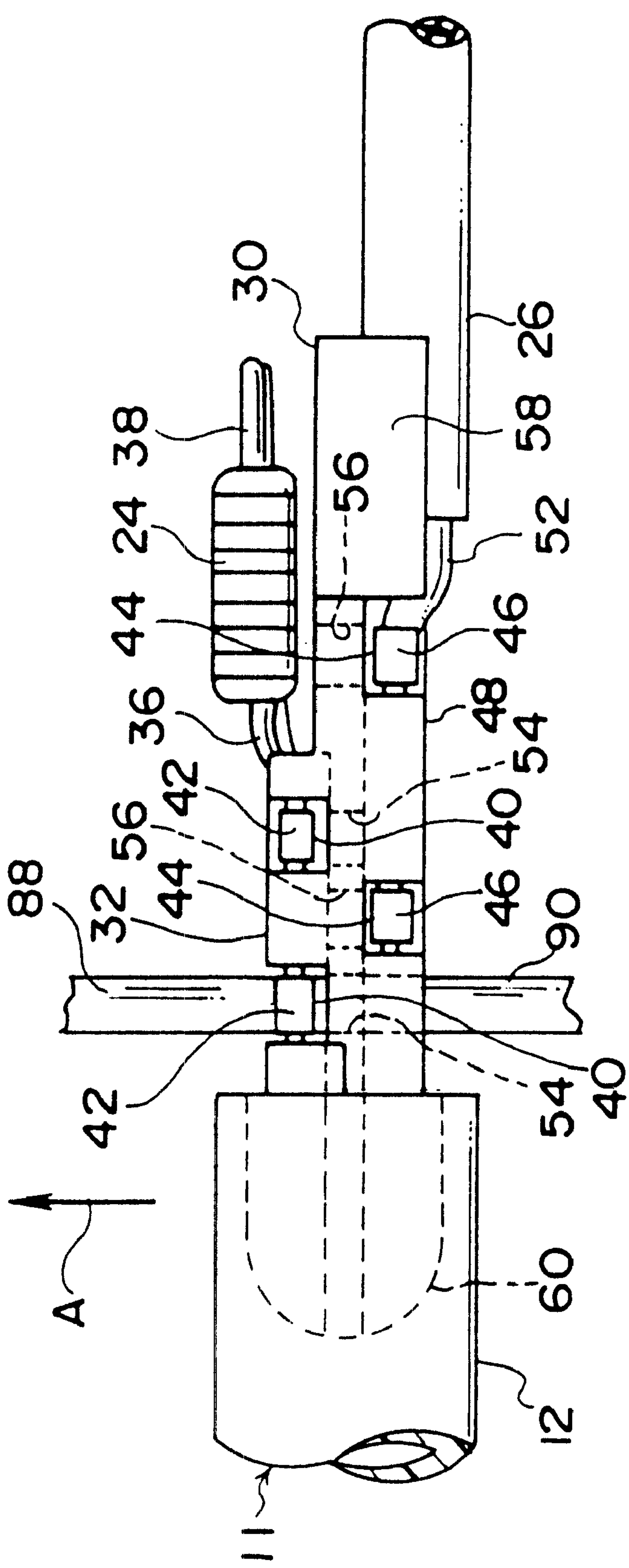
FIG. 12 is a side view showing a state in which an electrode wire is resistance-welded to the connecting member.

In this state, electrode wires 16 and 22 are arranged between the vertical walls 32 and 34 and on the caulking portion 42 of the conductive piece 40 prior to caulking. Here, the electrode 88 for resistance welding is put closer to the caulking portion 42 and either the electrode wire 16 or 22 from the side opposite to the support member 30 through the caulking portion 42 and the electrode wire 16 or 22. In addition, the electrode 90 for resistance welding is made to approach the caulking portion 42 and either the electrode 16 or 22 by inserting the electrode 90 into the interior of the transparent hole 54 corresponding to the caulking portion 42 and either the electrode wire 16 or 22 to which the electrode 88 is made to approach from the other opening end portion of the hole 54. The caulking portion 42 and either the electrode wire 16 or 22 are held between the electrodes 88 and 90. Using the holding force, the caulking portion 42 is caulked. Current is applied between the electrodes 88 and 90. Using the resultant resistant heat, the caulking portion 42 and either the electrode wire 16 or 22 are integrally welded (see FIG. 12).

Almost simultaneously with fixing the electrode wires 16 and 22 to the support member 30, the electrode wires 18 and 20 are arranged between the vertical walls 48 and 50. As in the case of the above-stated resistance welding step, the caulking portion 42 of the conductive piece 40 is caulked by the electrodes 88 and 90 and welded. The electrodes 16 and 22 are fixed to and integral with the support member 30.

In the pressure sensitive sensor 10 of the present embodiment, the spacer 60 extends from the support member 30. Therefore, by inserting the spacer 60 into the cross hole 14, the support member 30 can be simultaneously mounted to the sensor main body 11. Besides, as stated above, the support member 30 is substantially integral with the housing 12 by inserting the spacer 60 into the cross hole 14. The stability of the support member 30 during operation is thereby improved and working efficiency can be enhanced. Further, since the electrode wires 16, 18, 20 and 22, the resistor 24 and the cord 26 are fixedly connected on the support member 30, the flexible and quite fine electrode wires 16, 18, 20 and 22, the resistor 24 and the cord 26 become stable during connecting operation. In this sense, too, work efficiency can be enhanced. Moreover, as long as the spacer 60 is pulled from the housing 12 via the support member 30 on purpose (that is, as long as the engagement or fitting state between the spacer 60 and the housing 12 is forcibly released), the support member 30 is substantially integral with the housing 12. As a result, even after the connecting operation is over, the electrode wires 16, 18, 20 and 22, the resistor 24 and the cord 24 can be held in a stable manner. Owing to this, it is possible to prevent defects such as breaking of the electrode wires 16, 18, 22 and 22, the resistor 24, the cord 26 and the like from occurring while, for example, the pressure sensitive sensor 10 is transported to the next step after the connecting operation has been completed. Thus the quality of products is stable or enhanced.

Since the resistance welding is conducted by inserting either the electrode 88 or 90 into either the transparent hole 54 or 56 formed in the support member 30, there is no need to provide a portion of the support member 30 with conductive property to thereby make the formation of the support member 30 easier. Additionally, since the holding force of the electrodes 90 and 88 does not act on the support member 30, the strength of the material for the support member 30 does not need to be particularly high, allowing more latitude in the selection of materials for the support member 30. Furthermore, the caulking portion 46 of the conductive piece 44 is provided to be displaced in the width direction of the support member 30 with respect to the caulking portion 42 of the conductive piece 40 and the transparent hole 56 is displaced in the width direction of the support member 30 with respect to the transparent hole 54 accordingly. The transparent holes 54 and 56 do not overlap with each other. Due to this, if the electrode 88 or 90 is inserted from the other opening end portions of the transparent holes 54 and 56, the caulking portion 46 and 42 and the like on the other opening end portion side are not a hindrance to insertion of the electrode 88 or 90. As a result, the welding operation is facilitated.

As for the other terminal portion of the sensor main body 11, the spacer 60 is inserted into the cross hole 14 and the electrode wires 16 and 20 are arranged between the vertical walls 66 and 68. The caulking portion 72 of the conductive piece 70 is caulked and welded to thereby fix the electrode wires 16 and 20 to the support member 64 and make electrical continuity between the vertical wall 66 and the vertical wall 68. Besides, almost simultaneously with fixing the electrode wires 16 and 20, the electrode wires 18 and 22 are arranged between the vertical walls 80 and 82 and the caulking portion 72 of the conductive piece 70 is caulked and welded. Then, the electrode wires 18 and 22 are thermally deposited on the conductive piece 40 to thereby fix the electrode wires 18 and 22 to the support member 64 and make electrical continuity between the electrode wires 18 and 22. This process is basically the same as that for mounting of the support member 30 and connecting operation on one end portion of the sensor main body 11. The same function can be produced as that described above and substantially the same advantage can be achieved.

Next, in this state, the region in the vicinity of the terminal portion of the longitudinal one end portion of the sensor main body 11, the entirety of the support member 30 and the portion of the both cords 26 in the vicinity of the support member 30 are put into a mold of, for example, hollow cylindrical shape (not shown). An insulating thermoplastic synthetic resin material for the seal 62 is injected into the mold while applying pressure (which means pressure suitable for molding the synthetic resin material used) by a method corresponding to injection molding or transfer molding. At this time, the pressure of the synthetic resin material acts such that the housing 12 is compressed inwardly in the radial direction at the terminal portion of the sensor main body 11. The spacer 60 is inserted into the cross hole 14 at the terminal portion of the sensor main body 11. Therefore, even if the housing 12 is elastically deformed, some of the electrode wires 16, 18, 20 and 22 do not contact each other and make electrical continuity. Besides, since the end portion of the cross hole 14 is closed by the insertion of the spacer 60, entry of the synthetic resin material into the cross hole 14 is limited or prevented. As a result, no dead zone (which does not function as a sensor) except for the terminal portion of the sensor main body 11 is formed, thereby making it possible to enhance reliability.

In addition, simultaneously or almost simultaneously with the molding operation by using the synthetic resin material as described above, a molding operation is also conducted on the other terminal portion of the sensor main body 11. In the latter case, the same functions can be produced and the same advantages can be attained.

As can be seen from the above description, the end portion of the cross hole 14 is completely sealed by the seal 62 formed by molding the synthetic resin material on the both terminal portions of the sensor main body 11. Therefore, there is no entry of foreign matter such as water droplets, thus preventing malfunctioning caused by entry of droplets or the like. Since the support members 30 and 64 are enclosed by the seal 62, droplets or the like do not adhere to the connecting portions of, for example, the electrode wires 16, 18, 20 and 22, thereby preventing malfunctioning or corrosion caused by the adherence of droplets or the like. The synthetic resin material forming the seal 62 is liquid before it is cooled and set, and enters various clearances (such as that between the resistor 24 and the support member 30). Since the synthetic resin material is set, the seal portion 62 itself supports the respective members such as the resistor 24 fixed to the support member 30, thus enhancing durability. The seal 62 is formed basically only by putting predetermined portions into the mold and filling the mold with the synthetic resin material. In this sense as well, working efficiency improves.

As described above, to form the seal portion 62 by molding, the synthetic resin material is injected into the mold. Due to this, pressure for injecting the synthetic resin material is also applied to the electrode wires 16, 18, 20 and 22 pulled from the end portion of the housing 12 to forcibly displace the electrode wires 16, 18, 20 and 22 and the resistor 26. On the side of the longitudinal one end portion of the housing 12, the electrode wires 18, 20, the resistor 26, and the electrode wires 16 and 22 are supported by the support member 30 while being partitioned by the support member 30. The end portions of the electrode wires 18 and 20 exposed from the longitudinal one end portion of the housing 12 therefore do not contact with the electrode wires 16 and 22 and no short-circuiting occurs.

Likewise, on the longitudinal other end portion of the housing 12, the electrode wires 16, 20 and 18 and 21 are supported by the support member 64 while being partitioned by the support member 64. The end portions of the electrode wires 18 and 20 exposed from the longitudinal one end portion of the housing 12 do not therefore contact with the electrode wires 16 and 22 and no short-circuiting occurs.

In this way, short-circuiting at portions (pulled-out portions) of the electrode wires 16, 18, 20 and 22 exposed from the end portion of the housing 12 can be prevented, thus enhancing and stabilizing product quality. It is also possible to prevent production of defective products and to reduce manufacturing cost. Besides, since there is no need to consider the occurrence of short-circuiting, mass-production is easily realized. In this sense, too, cost reduction is possible.

In the present embodiment, the thermally molted synthetic resin material is injected into the mold and cooled and the seal 62 is thereby formed. The method for forming the seal 62 is not be limited thereto. The seal 62 may be formed by, for example, filling a thermosetting synthetic resin material in the mold, then heating and setting the material. So-called dipping molding may be also employed. Specifically, a region in which the seal 62 is formed is dipped into, for example, synthetic resin material or latex having fluidity such as liquid, gel or paste and then taken out. The synthetic resin or latex adhering to the region is cured or gelated.

In the present embodiment, the spacer 60 having a cross-shaped section is used. The shape of the spacer 60, however, should not be limited thereto. The spacer 60 may be, for example, substantially cylindrical shape or substantially conical shape for inserting the spacer 60 into only the central portion of the cross hole 14. Four spacers 60 of substantially cylindrical shape, substantially conical shape, narrow plate shape or block shape may be formed corresponding to the respective end portions of the cross hole 14 and inserted into portions excluding the crossing portion of the cross hole 14. The spacer 60 may be plate-shaped (as shown in, for example, FIG. 13). By forming the spacer 60 into those shapes, the spacer 60 may be inserted more easily, the support member 30 may better support elements with the spacer 60 inserted, and the manufacturing cost of the support member 30 may be reduced.

Further, in the present invention, the electrode wires 16 to 22 are arranged helically within the housing 12. As shown in, for example, FIG. 13, the sensor main body 11 maybe replaced by a sensor main body 102 wherein two thin and long plate-like electrode plates 104 and 106 are arranged to face each other via a clearance and a plate-like spacer 108 corresponding to the clearance between the electrode plates 104 and 106 may be inserted.

Figure 13:
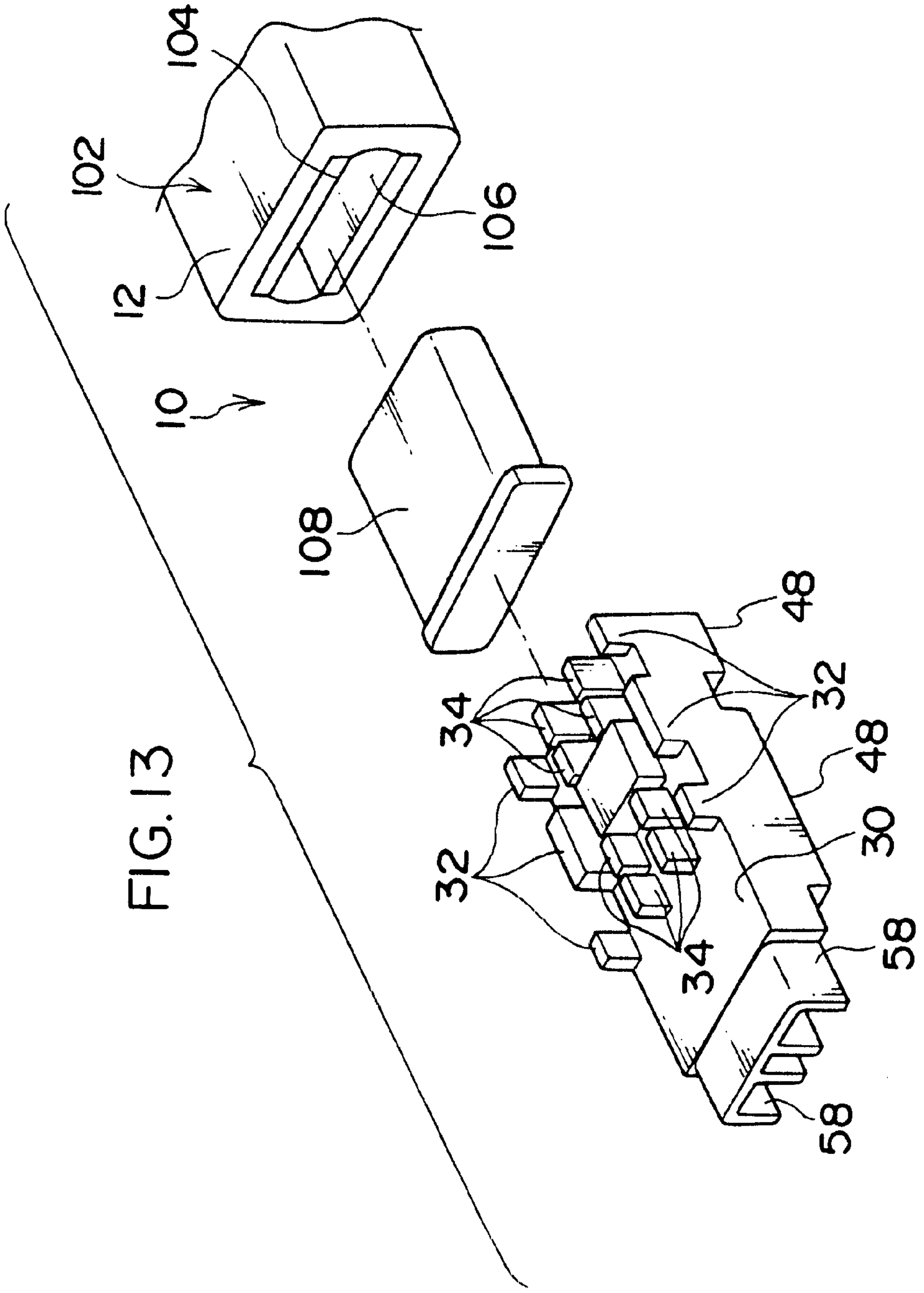
FIG. 13 is an exploded perspective view showing modified examples of a sensor main body, a support member and a spacer.

As shown in FIG. 13, in the modified embodiment, the support member is formed separately from the spacer 108. The separate structure might be lower in work efficiency than the integral structure. This structure, however, has an advantage in that the spacer 108 of various shapes and the support member 30 of various magnitude and shapes can be freely selected as required, which advantage cannot be obtained by the structure in which the support member 30 is integral with the spacer 108.

Further, in the present embodiment, the both end portions of the electrode wires 16, 18, 20 and 22 are connected by resistance welding. The connecting means for connecting the electrode wires 16, 18, 20 and 22 is not be limited thereto. So-called soldering is an example of the connecting means. If soldering is used as the connecting means, the end portions of the electrode wires 16, 18, 20 and 22 are fixed to the conductive pieces 40, 44, 70 and 74, while having electrical continuity between them by soldering. The electrode wires 16, 18, 20 and 22 may be connected in series through the conductive pieces 40, 44, 70 and 74. Alternatively, the end portions of the electrode wires 16, 18, 20 and 22 may be directly connected by a solder to thereby connect the electrode wires 16, 18, 20 and 22 in series.

Part or all of the seal 62 or regions in the vicinity of the seal 62 and housing 12 may be covered by reinforcing means having higher rigidity in terms of material or structure than the above-stated seal 62 or burying the reinforcing means into the seal 62, thereby increasing the rigidity of the seal 62.

A specific example using the reinforcing means will next be described as another embodiment according to the present invention. It is noted that basically same regions as in the first embodiment are denoted by the same reference numerals and no description will be given thereto.

Figure 14:
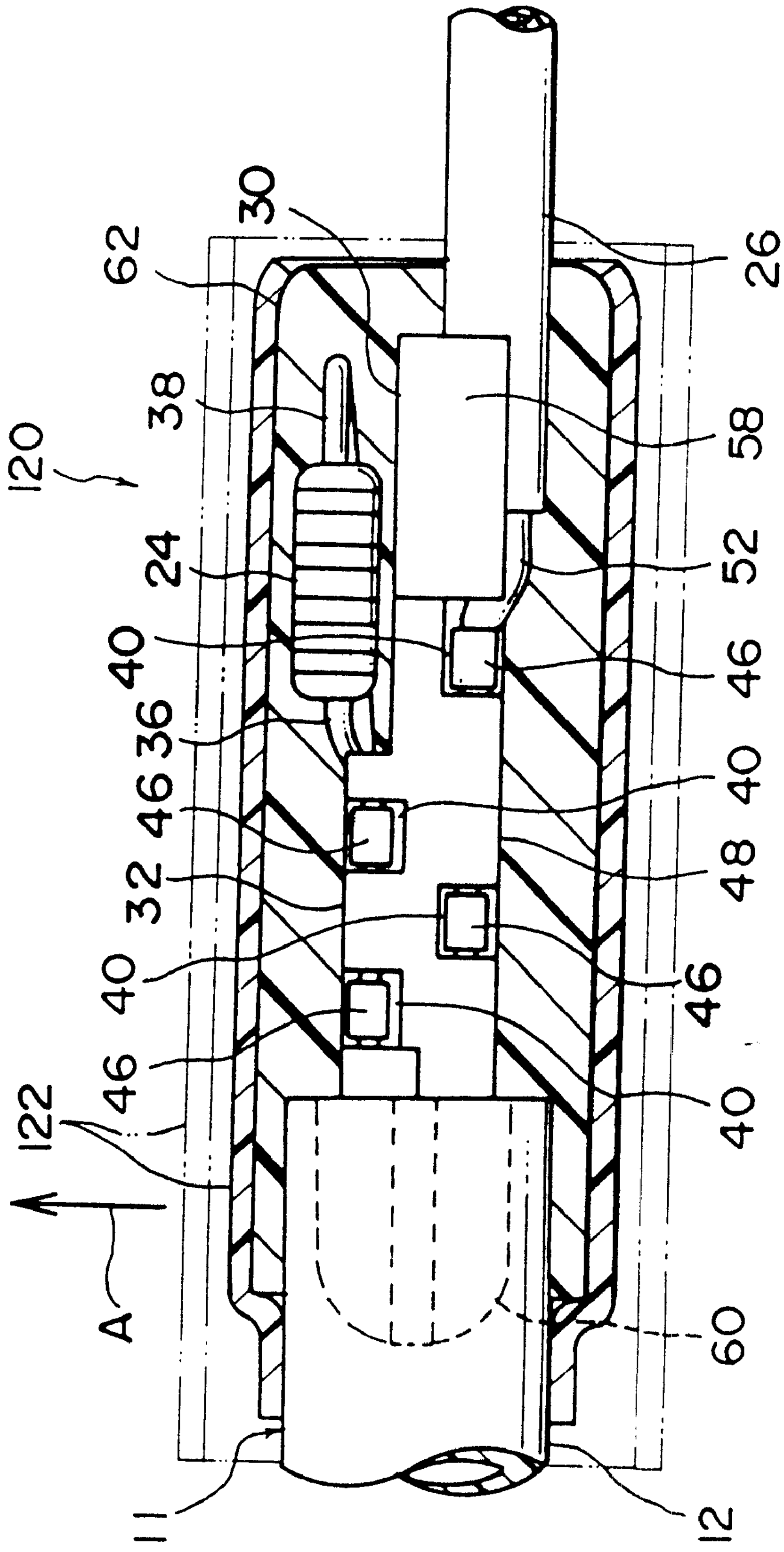
FIG. 14 is a side cross-sectional view showing the structure of a terminal portion of a pressure sensitive sensor in a second embodiment according to the present invention.

FIG. 14 is a cross-sectional view of the structure of the end portion of a pressure sensitive sensor 120 in the second embodiment according to the present invention.

As shown in FIG. 14, the pressure sensitive sensor 120 of the present invention comprises, as a reinforcing means, a thin and substantially cylindrical sheath 122. The sheath 122 is made of a hard synthetic resin material which is polyolefin-based, such as polyethylene, polypropylene, or the like, and which is crosslinkable when, for example, irradiated by radiation. The inner periphery of the sheath 122 is firmly attached to the outer periphery seal 62. One end portion of the sheath 122 in the axial direction protrudes with respect to the housing 12 side-end portion of the seal 62 and adheres to the outer peripheral portion in the vicinity of the end portion of the housing 12. The other end portion of the sheath 122 in the axial direction has a smaller diameter along the corner of the seal 62 and the sheath 122 adheres to the corner thereof.

In FIG. 14, the state of the sheath 122 before heat is applied is indicated by a two-dot chain line. The inner diameter of the sheath 122 before being heated is larger than the outer diameter of the seal 62. By heating the sheath 122, the sheath 122 is contracted mainly in the circumferential direction, with the result that both the inner and outer diameters are reduced. Accordingly, the inner peripheral portion of the sheath 122 adheres to the outer peripheral portion of the seal 62 and that of the housing 12 having a diameter smaller than that of the seal 62. That is, the sheath 122 is made of so-called heat contracting synthetic resin material.

In the pressure sensitive sensor 120 with the above-described structure, in the state in which the seal 62 is formed and cured, the sheath 122 before heat is applied (i.e., in a state indicated by the two-line chain line of FIG. 14) covers the seal portion 62 until one end portion of the sheath 122 protrudes with respect to the housing 12 side-end portion of the seal 62. Next, in this state, the sheath 122 is heated and contracts in the circumferential direction thereof. As described above, the inner and outer diameters of the sheath 122 become smaller as a result of heating. The inner peripheral portion of the sheath 122 adheres to the outer peripheral portion of the seal 62 and the protruding portion of the sheath 122 with respect to the housing 12 side-end portion of the seal 62 adheres to the outer peripheral portion of the housing 12. As a result, the boundary between the housing 12 and the seal 62 is sealed, thereby further enhancing the sealing property of the seal 62. At this time, the diameter of the other end portion of the sheath 122 is smaller corresponding to the corner of the other end portion of the seal 62 and the other end portion of the sheath 122 adheres to the seal 62 to surround the corner of the seal 62. Here, the side of the one end portion of the sheath 122 adheres to the housing 12 having a smaller diameter than the seal portion 62. In this state, the sheath 122 cannot be displaced in the axial directions of the seal 62 and the housing 12, thereby preventing the sheath 122 from detaching.

The sheath 122 has higher rigidity than that of the seal 62 at least after being heated as described above. For that reason, connecting portions of the electrode wires 16, 18, 20 and 22, the resistor 24 and leads 36 and 38 are held further firmly by the seal 62. This further ensures prevention of, for example, breaking of wires and core-disconnection of the electrode wires 16, 18, 20 and 22 caused by shock or the like applied while the pressure sensitive sensor 120 is installed.

In this embodiment, the sheath 122, which is formed of a polyolefin-based synthetic resin material crosslinkable by radiation, is used as the reinforcing means. However, the material of the reinforcing means is not limited thereto. The reinforcing means may have desirably higher rigidity than the seal 62 in terms of structure and material. It is not necessary that the synthetic resin material for the sheath 122 be crosslinkable. A synthetic resin material other than an olefin-based material may be used for the sheath 122. It is also possible to use a material other than a synthetic resin material, such as a hard rubber material and or a metal material, for the sheath 122.

In addition, in the present embodiment, the reinforcing means is solely the sheath 122. A plurality of members may be combined to serve as the reinforcing means as a whole. A specific example for forming the reinforcing means by combining a plurality of members will be described as the third embodiment according to the present invention.

Figure 15:
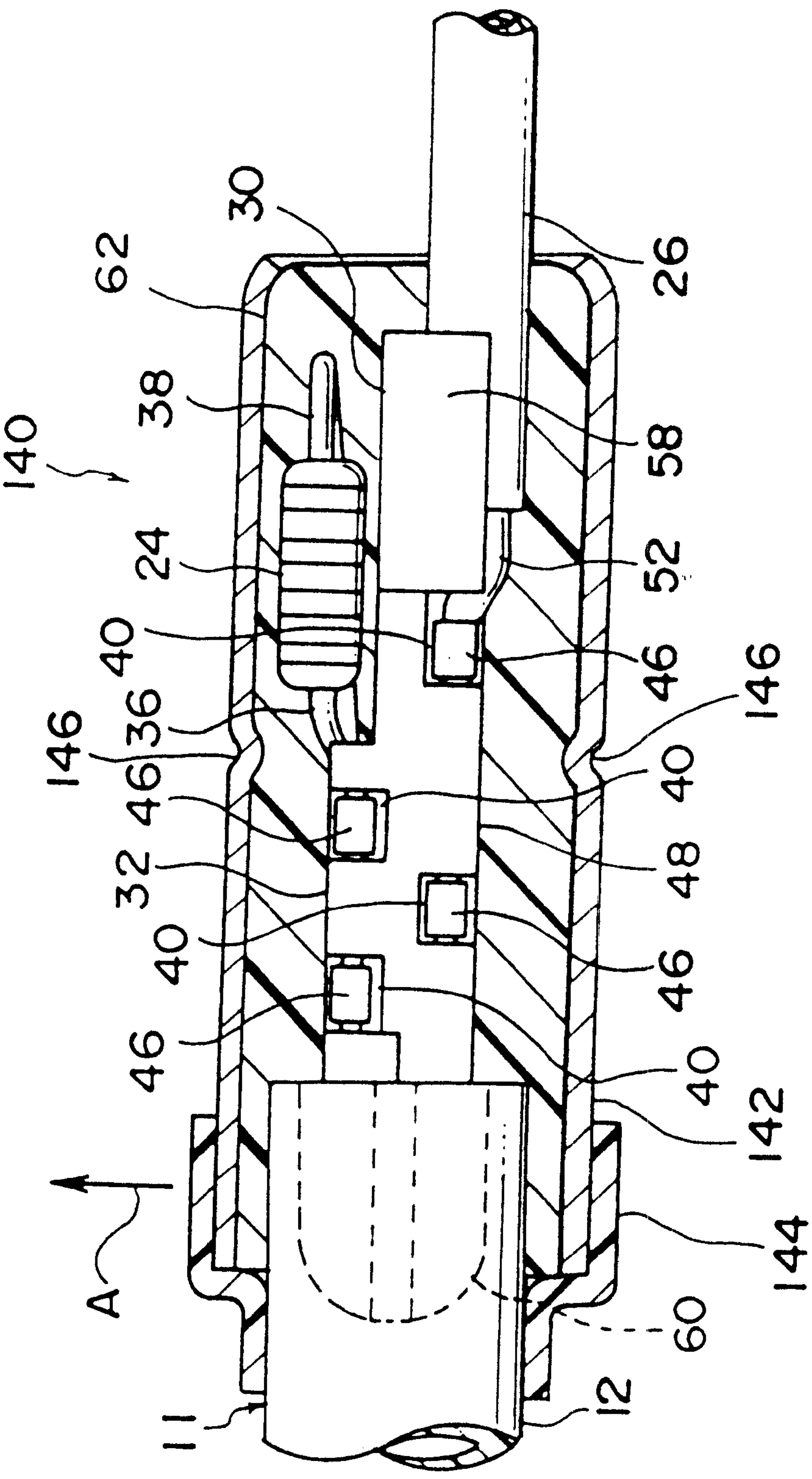
FIG. 15 is a side cross-sectional view showing the structure of a terminal portion of a pressure sensitive sensor in a third embodiment according to the present invention.

FIG. 15 is a cross-sectional view showing the structure of the terminal portion of a pressure sensitive sensor 140 in the third embodiment according to the present invention.

As shown therein, the pressure sensitive sensor 140 of the present invention comprises a sheath 142 serving as a reinforcing member ad a tube 144 serving as an auxiliary sealing member. The reinforcing member consists of the sheath 142 (i.e., reinforcing member) and the tube 144 (i.e., auxiliary sealing member).

The sheath 142 is formed of a thin metal tube. The inner diameter of the sheath 142 is slightly larger than the outer diameter of the seal portion 62 to such an extent that the sheath 142 can house the seal portion 62. The rigidity of the sheath 142 is higher than that of the seal portion 62 formed of a synthetic resin material. The axial intermediate portion of the sheath 142 is depressed inward in the diameter direction thereof and a protrusion 146 having an inner diameter protruding inward in the diameter direction. The protrusion 146 bites into the seal portion 62, thereby preventing the sheath 142 from detaching from the seal 62.

The tube 144 is formed of a polyolefin-based synthetic resin material which is made corsslinkable by radiation as in the case of the sheath 122 of the pressure sensitive sensor 120 in the second embodiment described above. When heat is applied, the tube 144 is contracted mainly in the circumferential direction. Differently from the sheath 122 of the pressure sensitive sensor 120 in the above second embodiment, the tube 144 adheres to the outer peripheral portion of the housing 12 on one end portion rather than the axial intermediate portion and adheres to the outer peripheral portion of the sheath 142 on the other end portion thereof.

Thus, the outer peripheral portion of the seal portion 62 is covered with the sheath 142 in the pressure sensitive sensor 140 in this embodiment. As a result, connecting portions of the electrode wires 16, 18, 20 and 22, the resistor 24 and the leads 36 and 38 within the seal 62 can be held further firmly. This further ensures, in turn, preventing breaking of wires and core disconnection of the electrode wires 16, 18, 20 and 22 due to shock or the like applied during installation of the pressure sensitive sensor 120.

In the pressure sensitive sensor 140 in the present embodiment, the tube 144 adheres to both the sheath 142 and the housing 12, with the result that the boundary between the seal 62 and the housing 12 is sealed by the tube 144. The sealing property of the seal portion 62 can be further enhanced.

In the respective embodiments described above, the sheath 122 or sheath 142 serving as reinforcing means or a reinforcing member is provided outside the already-cured seal 62. The reinforcing means or reinforcing member may consequently cover the outer peripheral portion of the seal 62. That is, a thin, cylindrical sheath, serving as reinforcing means or a reinforcing member, made of metal material and having an axial length larger than that of the seal 62 is caulked while overlapping the end portion of the housing 12. The synthetic resin material is poured into the sheath from the opening portion opposite to the caulked portion. The synthetic resin material is cured within the cylindrical sheath to thereby form a seal 62.

What is claimed is:

1. A pressure sensitive sensor comprising:

an insulating hollow housing deformable by an external pressure and having a sealable end portion having terminal portions;

a plurality of conductors located within said housing, electrically connected to said terminal portions and set apart from one another with a space therebetween, each conductor having at least a longitudinal end portion thereof extending from said housing, said conductors being deformable by an external force acting on said housing to enable the conductors to make electrical contact with one another;

an insulating spacer provided within the housing for contacting said plurality of conductors and insulating the plurality of conductors from one another; and an insulating seal for sealing the terminal portions of said housing as well as said conductors and said spacer.

2. A pressure sensitive sensor according to claim 1, further comprising a support member for supporting a plurality of connecting portions that electrically connect the plurality of conductors to connectors of a determination means through said housing, said determination means for determining whether said plurality of conductors are in electrical contact with one another, said seal for sealing said support member, said plurality of conductors and said spacer.

3. A pressure sensitive sensor according to claim 2, wherein said support member is integral with said spacer.

4. A method for sealing an open end portion of an insulating hollow housing of a pressure sensitive sensor, the housing being deformable by an external pressure, the end portion having terminal portions, the housing including a plurality of conductors located within said housing, electrically connected to said terminal portions and set apart from one another with a space therebetween, each conductor having at least a longitudinal end portion thereof extending from said housing, said conductors being deformable by an external force acting on said housing to enable the conductors to make electrical contact with one another, comprising the steps of:

locating an insulating spacer in the space between said plurality of conductors so that the spacer operatively contacts and insulates said plurality of conductors and insulates said end portion and said terminal portions; and sealing the terminal portions of said housing and said spacer with an insulating seal member.

5. A method for sealing an open end portion of a pressure sensitive sensor according to claim 4, further comprising the steps of:

providing a support member for supporting connecting means for electrically connecting the plurality of conductors, said connecting means electrically connecting said plurality of connectors of a determination means through said housing, said determination means for determining whether said plurality of conductors are in electrical contact with one another, and sealing said support member, said conductors, said connectors, said spacer, and said housing with said seal member.

6. A method for sealing an open end portion of a pressure sensitive sensor according to claim 5, wherein said support member is integral with said spacer, further comprising the step of inserting said spacer from said open end portion into the space between said plurality of conductors such that said support member is located near said open end portion.

7. A pressure sensitive sensor comprising:

an insulating hollow housing deformable by an external pressure and having an open end portion;

a plurality of conductors located within said housing and set apart from one another with a spece therebetween, each conductor having at least a longitudinal end portion thereof extending from said end portion of the hollow housing, said conductors deformable by an external force acting on said housing to enable the conductors to make electrical contact with one another;

an insulating spacer located within the end portion of the housing for contacting the plurality of conductors and for insulating the plurality of conductors from one another; and an insulating seal comprising an electrically insulating curable material surrounding the end portion of the housing and the spacer and cured thereon to seal the end portion of the housing, the spacer and the conductors.

8. A pressure sensitive sensor according to claim 7, further comprising a support member for supporting connecting portions that electrically connect the plurality of conductors to connectors of a determination means through the end portion of the housing, said determination means for determining whether said plurality of conductors are in electrical contact; and wherein the insulating seal seals the support member, the conductors and the spacer at said end portion of the housing.

9. A pressure sensitive sensor according to claim 8, wherein said support member is integral with said spacer.

10. A method for sealing an open end portion of a pressure sensitive sensor including:

an insulating hollow housing deformable by external pressure; and a plurality of conductors disposed within the housing and set apart from one another with a space therebetween;

each conductor having at least a longitudinal end portion thereof extending from said end portion of the hollow housing, and said conductors deformable by an external force acting on said housing to enable the conductors to make electrical contact with one another, the method comprising the steps of:

disposing an insulating spacer within the end portion of the housing to come in contact with said plurality of conductors and to insulate said plurality of conductors from one another;

providing an electrically insulating curable material on the end portion of the housing and the spacer; and causing the curable material to cure thereon to seal the end portion of the housing, the conductors and the spacer.

11. The method of claim 10, further comprising the steps of:

providing a support member for supporting a plurality of connecting portions that electrically connect the plurality of conductors to connectors of a determination means through an end portion of the housing, the determination means for determining whether the plurality of conductors are in electrical contact;

providing an electrically insulating curable material on the end portion of the housing, the spacer and the support member; and causing the curable material to cure thereon to seal the support member, the conductors, the connectors and the spacer at the end portion of the housing.

12. The method of claim 11, further comprising making the support member integral with the spacer and inserting the spacer from the end portion of the housing into the space between the plurality of conductors such that the support member is disposed near the end portion.

* * * * *